(12) United States Patent
Hendry

(10) Patent No.: US 12,323,606 B2
(45) Date of Patent: Jun. 3, 2025

(54) MEDIA FILE GENERATION/RECEPTION METHOD AND DEVICE FOR SIGNALING OPERATING POINT INFORMATION AND OUTPUT LAYER SET INFORMATION, AND COMPUTER-READABLE RECORDING MEDIUM IN WHICH MEDIA FILE IS STORED

(71) Applicant: LG ELECTRONICS INC., Seoul (KR)

(72) Inventor: Hendry Hendry, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 114 days.

(21) Appl. No.: 18/026,542

(22) PCT Filed: Sep. 23, 2021

(86) PCT No.: PCT/KR2021/012958
§ 371 (c)(1),
(2) Date: Mar. 15, 2023

(87) PCT Pub. No.: WO2022/065875
PCT Pub. Date: Mar. 31, 2022

(65) Prior Publication Data
US 2023/0379481 A1 Nov. 23, 2023

Related U.S. Application Data

(60) Provisional application No. 63/081,337, filed on Sep. 22, 2020.

(51) Int. Cl.
*H04N 19/30* (2014.01)
*H04N 19/184* (2014.01)
*H04N 19/187* (2014.01)

(52) U.S. Cl.
CPC .......... *H04N 19/30* (2014.11); *H04N 19/184* (2014.11); *H04N 19/187* (2014.11)

(58) Field of Classification Search
CPC .... H04N 19/30; H04N 19/184; H04N 19/187; H04N 21/231; H04N 21/235; H04N 21/236; H04N 21/434; H04N 21/435
(Continued)

(56) References Cited

U.S. PATENT DOCUMENTS

2016/0105688 A1* 4/2016 Hendry ................. H04N 19/44
375/240.25
2016/0373771 A1* 12/2016 Hendry ................. H04N 19/30
(Continued)

FOREIGN PATENT DOCUMENTS

KR 10-2015-0079732 A 7/2015
KR 10-2016-0031499 A 3/2016
(Continued)

*Primary Examiner* — Susan E. Hodges
(74) *Attorney, Agent, or Firm* — Bryan Cave Leighton Paisner LLP

(57) ABSTRACT

A media file generating/receiving method and apparatus for signaling operating point information and output layer set information and a method of transmitting a media file are provided. A media file receiving method may comprise obtaining operating point information for the video data from the media file and processing the video data based on the obtained operating point information. The operating point information may include information on a number of operating points for the video data, and a bit length of the information on the number of operating points may be 12 bits.

14 Claims, 16 Drawing Sheets

(58) Field of Classification Search
USPC .......................................................... 375/240
See application file for complete search history.

(56) References Cited

U.S. PATENT DOCUMENTS

2022/0086499 A1\* 3/2022 Wang .................... H04N 19/186
2022/0229640 A1\* 7/2022 Bryan ....................... G06F 8/35

FOREIGN PATENT DOCUMENTS

| KR | 10-2017-0069214 A | 6/2017 |
| KR | 10-2017-0115063 A | 10/2017 |
| KR | 10-2018-0068979 A | 6/2018 |

\* cited by examiner

FIG. 9

Syntax

```
class VvcOperatingPointsRecord {
    unsigned int(8) num_profile_tier_level_minus1;
    for (i=0; i<=num_profile_tier_level_minus1; i++) {
        unsigned int(8) ptl_max_temporal_id[i];
        VvcPTLRecord(ptl_max_temporal_id[i]+1) ptl[i];
    }
    unsigned int(1) all_independent_layers_flag;
    bit(7) reserved = 0;
    if (all_independent_layers_flag){
    unsigned int(1) each_layer_is_an_ols_flag;
        bit(7) reserved = 0;
    } else
        unsigned int(8) ols_mode_idc;
    unsigned int(16) num_operating_points;
    for (i=0; i<num_operating_points) {
        unsigned int(16) output_layer_set_idx;
        unsigned int(8) ptl_idx;
        unsigned int(8) max_temporal_id;
        unsigned int(8) layer_count;
        for (j=0; j<layer_count; j++) {
            unsigned int(6) layer_id;
            unsigned int(1) is_outputlayer;
            bit(1) reserved = 0;
        }
        bit(6) reserved = 0;
        unsigned int(1) frame_rate_info_flag
        unsigned int(1) bit_rate_info_flag
        if (frame_rate_info_flag) {
            unsigned int(16) avgFrameRate;
            bit(6) reserved = 0;
            unsigned int(2) constantFrameRate;
        }
        if (bit_rate_info_flag) {
            unsigned int(32) maxBitRate;
            unsigned int(32) avgBitRate;
        }
    }
    unsigned int(8) max_layer_count;
    for (i=0; i<max_layer_count; i++) {
        unsigned int(8) layerID;
        unsigned int(8) num_direct_ref_layers;
        for (j=0; j<num_direct_ref_layers; j++)
            unsigned int(8) direct_ref_layerID;
        unsigned int(8) max_tid_il_ref_pics_plus1;
    }
} class VvcOperatingPointsInformation extends VisualSampleGroupEntry ('vopi') {
    VvcOperatingPointsRecord oinf;
}
```

FIG. 10

Syntax

```
aligned(8) class OperatingPointGroupBox extends
EntityToGroupBox('opeg',0,0)
{
    unsigned int(8) num_profile_tier_level_minus1;
    for (i=0; i<=num_profile_tier_level_minus1; i++)
        VvcPTLRecord(0) opeg_ptl[i];
    unsigned int(16) num_operating_points;
    for (i=0; i<num_operating_points) {
        unsigned int(16) output_layer_set_idx;
        unsigned int(8) ptl_idx;
        unsigned int(8) max_temporal_id;
        unsigned int(8) layer_count;
        for (j=0; j<layer_count; j++) {
            unsigned int(6) layer_id;
            unsigned int(1) is_outputlayer;
            bit(1) reserved = 0;
        }
        bit(6) reserved = 0;
        unsigned int(1) frame_rate_info_flag
        unsigned int(1) bit_rate_info_flag
        if (frame_rate_info_flag) {
            unsigned int(16) avgFrameRate;
            bit(6) reserved = 0;
            unsigned int(2) constantFrameRate;
        }
        if (bit_rate_info_flag) {
            unsigned int(32) maxBitRate;
            unsigned int(32) avgBitRate;
        }
        unsigned int(8) entity_count;
        for (j=0; j<entity_count; j++) {
            unsigned int(8) entity_idx;
        }
    }
}
```

FIG. 11

Syntax

```
aligned(8) class VvcPTLRecord(num_sublayers) {
    unsigned int(8) num_bytes_constraint_info;
    unsigned int(7) general_profile_idc;
    unsigned int(1) general_tier_flag;
    unsigned int(8) general_level_idc;
    unsigned int(1) ptl_frame_only_constraint_flag;
    unsigned int(1) ptl_multilayer_enabled_flag;
    if (num_bytes_constraint_info > 0)
        unsigned int(8*num_bytes_constraint_info - 2)
general_constraint_info;   for (i=num_sublayers - 2; i >= 0; i--)
        unsigned int(1) ptl_sublayer_level_present_flag[i];
    for (j=num_sublayers; j<=8 && num_sublayers > 1; j++)
        bit(1) ptl_reserved_zero_bit = 0;
    for (i=num_sublayers-2; i >= 0; i--)
        if (ptl_sublayer_level_present[i])
            unsigned int(8) sublayer_level_idc[i];
    unsigned int(8) num_sub_profiles;
    for (j=0; j < num_sub_profiles; j++)
        unsigned int(32) general_sub_profile_idc;
}
```

FIG. 12

Syntax

```
aligned(8) class VvcDecoderConfigurationRecord {
    unsigned int(8) configurationVersion = 1;
    unsigned int(16) avgFrameRate;
    unsigned int(2) constantFrameRate;
    unsigned int(3) numTemporalLayers;
    unsigned int(2) lengthSizeMinusOne;
    unsigned int(1) ptl_present_flag;
    if (ptl_present_flag) {
        VvcPTLRecord(numTemporalLayers) track_ptl;
        unsigned int(16) output_layer_set_idx;
    }
    unsigned int(1) chroma_format_present_flag;
    if (chroma_format_present_flag)
        unsigned int(2) chroma_format_idc;
    else
        bit(2) reserved = '11'b;
    unsigned int(1) bit_depth_present_flag;
    if (bit_depth_present_flag)
            unsigned int(3) bit_depth_minus8;
    else
        bit(3) reserved = '111'b;
    unsigned int(1) reserved= '1'b;
    unsigned int(8) numOfArrays;
    for (j=0; j < numOfArrays; j++) {
        unsigned int(1) array_completeness;
        bit(1) reserved = 0;
        unsigned int(6) NAL_unit_type;
        unsigned int(16) numNalus;
        for (i=0; i< numNalus; i++) {
            unsigned int(16) nalUnitLength;
            bit(8*nalUnitLength) nalUnit;
        }
    }
}
```

FIG. 13

Syntax

```
class VvcOperatingPointsRecord {
  unsigned int(8) num_profile_tier_level_minus1;
  for (i=0; i<=num_profile_tier_level_minus1; i++) {
    unsigned int(8) ptl_max_temporal_id[i];
    VvcPTLRecord(ptl_max_temporal_id[i]+1) ptl[i];
  }
  unsigned int(1) all_independent_layers_flag;
  bit(7) reserved = 0;
  if (all_independent_layers_flag){
  unsigned int(1) each_layer_is_an_ols_flag;
    bit(7) reserved = 0;
  } else
    unsigned int(8) ols_mode_idc;
  unsigned int(12) num_operating_points;
  bit(4) reserved = 0;
  for (i=0; i<num_operating_points) {
    unsigned int(16) output_layer_set_idx;
    unsigned int(8) ptl_idx;
    unsigned int(8) max_temporal_id;
    unsigned int(8) layer_count;
    for (j=0; j<layer_count; j++) {
      unsigned int(6) layer_id;
      unsigned int(1) is_outputlayer;
      bit(1) reserved = 0;
    }
    bit(6) reserved = 0;
    unsigned int(1) frame_rate_info_flag
    unsigned int(1) bit_rate_info_flag
    if (frame_rate_info_flag) {
      unsigned int(16) avgFrameRate;
      bit(6) reserved = 0;
      unsigned int(2) constantFrameRate;
    }
    if (bit_rate_info_flag) {
      unsigned int(32) maxBitRate;
      unsigned int(32) avgBitRate;
    }
  }
  unsigned int(8) max_layer_count;
  for (i=0; i<max_layer_count; i++) {
    unsigned int(8) layerID;
    unsigned int(8) num_direct_ref_layers;
    for (j=0; j<num_direct_ref_layers; j++)
      unsigned int(8) direct_ref_layerID;
    unsigned int(8) max_tid_il_ref_pics_plus1;
  }
}
```

FIG. 14

```
aligned(8) class OperatingPointGroupBox extends EntityToGroupBox('opeg',0,0)
{
    unsigned int(8) num_profile_tier_level_minus1;
    for (i=0; i<=num_profile_tier_level_minus1; i++)
        VvcPTLRecord(0) opeg_ptl[i];
    unsigned int(12) num_operating_points;
    bit(4) reserved = 0;
    for (i=0; i<num_operating_points) {
        unsigned int(16) output_layer_set_idx;
        unsigned int(8) ptl_idx;
        unsigned int(8) max_temporal_id;
        unsigned int(8) layer_count;
        for (j=0; j<layer_count; j++) {
            unsigned int(6) layer_id;
            unsigned int(1) is_outputlayer;
            bit(1) reserved = 0;
        }
        bit(6) reserved = 0;
        unsigned int(1) frame_rate_info_flag
        unsigned int(1) bit_rate_info_flag
        if (frame_rate_info_flag) {
            unsigned int(16) avgFrameRate;
            bit(6) reserved = 0;
            unsigned int(2) constantFrameRate;
        }
        if (bit_rate_info_flag) {
            unsigned int(32) maxBitRate;
            unsigned int(32) avgBitRate;
        }
        unsigned int(8) entity_count;
        for (j=0; j<entity_count; j++) {
            unsigned int(8) entity_idx;
        }
    }
}
```

FIG. 15

Syntax

```
class VvcOperatingPointsRecord {
  unsigned int(8) num_profile_tier_level_minus1;
  for (i=0; i<=num_profile_tier_level_minus1; i++) {
    unsigned int(8) ptl_max_temporal_id[i];
    VvcPTLRecord(ptl_max_temporal_id[i]+1) ptl[i];
  }
  unsigned int(1) all_independent_layers_flag;
  bit(7) reserved = 0;
  if (all_independent_layers_flag){
  unsigned int(1) each_layer_is_an_ols_flag;
    bit(7) reserved = 0;
  } else
    unsigned int(8) ols_mode_idc;
  unsigned int(12) num_operating_points;
  bit(3) reserved = 0;
  unsigned int(1) same_ols_idx_flag;
  if (same_ols_idx_flag){
    unsigned int(16) op_ols_idx;
  }
  for (i=0; i<num_operating_points) {
    unsigned int(8) ptl_idx;
    unsigned int(8) max_temporal_id;
    if (!same_ols_idx_flag){
      unsigned int(16) output_layer_set_idx;
      unsigned int(8) layer_count;
      for (j=0; j<layer_count; j++) {
        unsigned int(6) layer_id;
        unsigned int(1) is_outputlayer;
        bit(1) reserved = 0;
      }
    }
    bit(6) reserved = 0;
    unsigned int(1) frame_rate_info_flag
    unsigned int(1) bit_rate_info_flag
    if (frame_rate_info_flag) {
      unsigned int(16) avgFrameRate;
      bit(6) reserved = 0;
      unsigned int(2) constantFrameRate;
    }
    if (bit_rate_info_flag) {
      unsigned int(32) maxBitRate;
      unsigned int(32) avgBitRate;
    }
  }
  unsigned int(8) max_layer_count;
  for (i=0; i<max_layer_count; i++) {
    unsigned int(8) layerID;
    unsigned int(8) num_direct_ref_layers;
    for (j=0; j<num_direct_ref_layers; j++)
      unsigned int(8) direct_ref_layerID;
    unsigned int(8) max_tid_il_ref_pics_plus1;
  }
}
```

FIG. 16

```
aligned(8) class OperatingPointGroupBox extends EntityToGroupBox('opeg',0,0)
{
    unsigned int(8) num_profile_tier_level_minus1;
    for (i=0; i<=num_profile_tier_level_minus1; i++)
        VvcPTLRecord(0) opeg_ptl[i];
    unsigned int(12) num_operating_points;
    bit(3) reserved = 0;
    unsigned int(1) same_ols_idx_flag;
    if (same_ols_idx_flag){
        unsigned int(16) op_ols_idx;
    }
    for (i=0; i<num_operating_points) {
        unsigned int(8) ptl_idx;
        unsigned int(8) max_temporal_id;
        if (!same_ols_idx_flag){
            unsigned int(16) output_layer_set_idx;
            unsigned int(8) layer_count;
            for (j=0; j<layer_count; j++) {
                unsigned int(6) layer_id;
                unsigned int(1) is_outputlayer;
                bit(1) reserved = 0;
            }
        }
        bit(6) reserved = 0;
        unsigned int(1) frame_rate_info_flag
        unsigned int(1) bit_rate_info_flag
        if (frame_rate_info_flag) {
            unsigned int(16) avgFrameRate;
            bit(6) reserved = 0;
            unsigned int(2) constantFrameRate;
        }
        if (bit_rate_info_flag) {
            unsigned int(32) maxBitRate;
            unsigned int(32) avgBitRate;
        }
        unsigned int(8) entity_count;
        for (j=0; j<entity_count; j++) {
            unsigned int(8) entity_idx;
        }
    }
}
```

MEDIA FILE GENERATION/RECEPTION METHOD AND DEVICE FOR SIGNALING OPERATING POINT INFORMATION AND OUTPUT LAYER SET INFORMATION, AND COMPUTER-READABLE RECORDING MEDIUM IN WHICH MEDIA FILE IS STORED

CROSS-REFERENCE TO RELATED APPLICATIONS

This application is the National Stage filing under 35 U.S.C. 371 of International Application No. PCT/KR2021/012958, filed on Sep. 23, 2021, which claims the benefit of U.S. Provisional Application No. 63/081,337, filed on Sep. 22, 2020, the contents of which are all hereby incorporated by reference herein in their entirety.

TECHNICAL FIELD

The present disclosure relates to a media file generating/receiving method and apparatus and, more particularly, to a media file generating/receiving method and apparatus for signaling operating point information and output layer set information and a computer-readable recording medium storing a media file generated by the media file generating method/apparatus of the present disclosure.

BACKGROUND ART

Recently, the demand for high-resolution and high-quality images such as 360-degree images is increasing. As the resolution or quality of an image increases, a file capacity or a frame rate increase, which inevitably increases storage cost and transmission cost. In addition, as mobile devices such as smartphones and tablet PCs become popular, the demand for multimedia services based on communication networks is rapidly increasing. However, there is a problem that hardware and network resources for multimedia services are limited.

Accordingly, there is a need for high-efficiency image compression and file processing technologies for more effectively storing and transmitting image data.

DISCLOSURE

Technical Problem

An object of the present disclosure is to provide a media file generating/receiving method and apparatus with improved media file generating/receiving efficiency.

Also, an object of the present disclosure is to provide a media file generating/receiving method and apparatus capable of improving media file generating/receiving efficiency by signaling operating point information and output layer set information.

Also, an object of the present disclosure is to provide a method of transmitting a media file generated by a media file generating method or apparatus according to the present disclosure.

Also, an object of the present disclosure is to provide a recoding medium storing a media file generated by a media file generating method or apparatus according to the present disclosure.

Also, an object of the present disclosure is to provide a recording medium storing a media file received by a media file receiving apparatus according to the present disclosure and used to reconstruct an image.

The technical problems solved by the present disclosure are not limited to the above technical problems and other technical problems which are not described herein will become apparent to those skilled in the art from the following description.

Technical Solution

A media file receiving method performed by a media file receiving apparatus according to an aspect of the present disclosure may comprise obtaining operating point information for the video data from the media file and processing the video data based on the obtained operating point information. The operating point information may include information on a number of operating points for the video data, and a bit length of the information on the number of operating points may be 12 bits.

In the image media file receiving method of the present disclosure, the bit length of the information on the number of operating points may be determined based on maximum number of output layer sets and maximum temporal sublayer.

In the image media file receiving method of the present disclosure, the operating point information may further include first information indicating whether all operating points are associated with a same output layer set.

In the image media file receiving method of the present disclosure, information indicating an output layer index of all the operating points may be obtained based on the first information indicating that all the operating points are associated with the same output layer set.

In the image media file receiving method of the present disclosure, all the operating points may be associated with an output layer set with index 0 based on the first information indicating that all the operating points are associated with the same output layer set.

In the image media file receiving method of the present disclosure, an output layer set index of each operating point may not be obtained based on the first information indicating that all the operating points are associated with the same output layer set.

In the image media file receiving method of the present disclosure, a value of the output layer set index of each operating point may be inferred to be the same as a value of the output layer set index of all the operating points based on the first information indicating that all the operating points are associated with the same output layer set and presence of information indicating the output layer index of all the operating points.

In the image media file receiving method of the present disclosure, a value of an output layer set index of each operating point may be inferred to be 0 based on the first information indicating that all the operating points are associated with the same output layer set.

In the image media file receiving method of the present disclosure, information indicating the required number of layers of operating points may not be obtained based on the first information indicating that all the operating points are associated with the same output layer set.

In the image media file receiving method of the present disclosure, all tracks associated with operating points may contain samples of one layer based on the first information indicating that all the operating points are associated with the same output layer set.

In the image media file receiving method of the present disclosure, information indicating whether a layer is an output layer may not be obtained based on the first information indicating that all the operating points are associated with the same output layer set.

A media file receiving apparatus according to another aspect of the present disclosure may comprise a memory and at least one processor. The at least one processor may obtain operating point information for video data from a media file and process the video data based on the obtained operating point information. The operating point information may include information on a number of operating points for the video data, and a bit length of the information on the number of operating points may be 12 bits.

A media file generating method performed by a media file generating apparatus according to another aspect of the present disclosure may comprise generating operating point information for the video data and generating the media file based on the obtained operating point information. The operating point information may include information on a number of operating points for the video data, and a bit length of information on the number of operating points may be 12 bits.

In a media file transmitting method according to another aspect of the present disclosure, a media file generated by the media file generating apparatus or the media file generating apparatus of the present disclosure may be transmitted.

A computer-readable recording medium according to another aspect of the present disclosure may store a media file generated by the media file generating method or the media file generating apparatus of the present disclosure.

The features briefly summarized above with respect to the present disclosure are merely exemplary aspects of the detailed description below of the present disclosure, and do not limit the scope of the present disclosure.

Advantageous Effects

According to the present disclosure, it is possible to provide a media file generating/receiving method and apparatus with improved media file generating/receiving efficiency.

According to the present disclosure, it is possible to provide a media file generating/receiving method and apparatus capable of improving media file generating/receiving efficiency by signaling operating point information and output layer set information.

According to the present disclosure, it is possible to provide a method of transmitting a media file generated by a media file generating method or apparatus according to the present disclosure.

According to the present disclosure, it is possible to provide a recoding medium storing a media file generated by a media file generating method or apparatus according to the present disclosure.

According to the present disclosure, it is possible to provide a recording medium storing a media file received by a media file receiving apparatus according to the present disclosure and used to reconstruct an image.

It will be appreciated by persons skilled in the art that that the effects that can be achieved through the present disclosure are not limited to what has been particularly described hereinabove and other advantages of the present disclosure will be more clearly understood from the detailed description.

DESCRIPTION OF DRAWINGS

FIG. 9 is a diagram illustrating an example of a syntax structure VvcOperatingPointsRecord for signaling operating point information.

FIG. 10 is a diagram illustrating an example of a syntax structure for signaling an operating point entity group.

FIGS. 11 and 12 are diagrams illustrating an example of a syntax structure for signaling a PTL record and a decoder configuration record.

FIG. 13 is a diagram illustrating an example of a syntax structure for signaling operating point number information in VvcOperatingPointsRecord according to an embodiment of the present disclosure.

FIG. 14 is a diagram illustrating an example of a syntax structure for signaling operating point number information in OperatingPointGroupBox according to an embodiment of the present disclosure.

FIG. 15 is a diagram illustrating an example of a syntax structure for signaling information indicating whether all operating points in VvcOperatingPointsRecord are associated with the same output layer set according to an embodiment of the present disclosure.

FIG. 16 is a diagram illustrating an example of a syntax structure for signaling information indicating whether all operating points in OperatingPointGroupBox are associated with the same output layer set according to an embodiment of the present disclosure.

MODE FOR INVENTION

Figure 1:
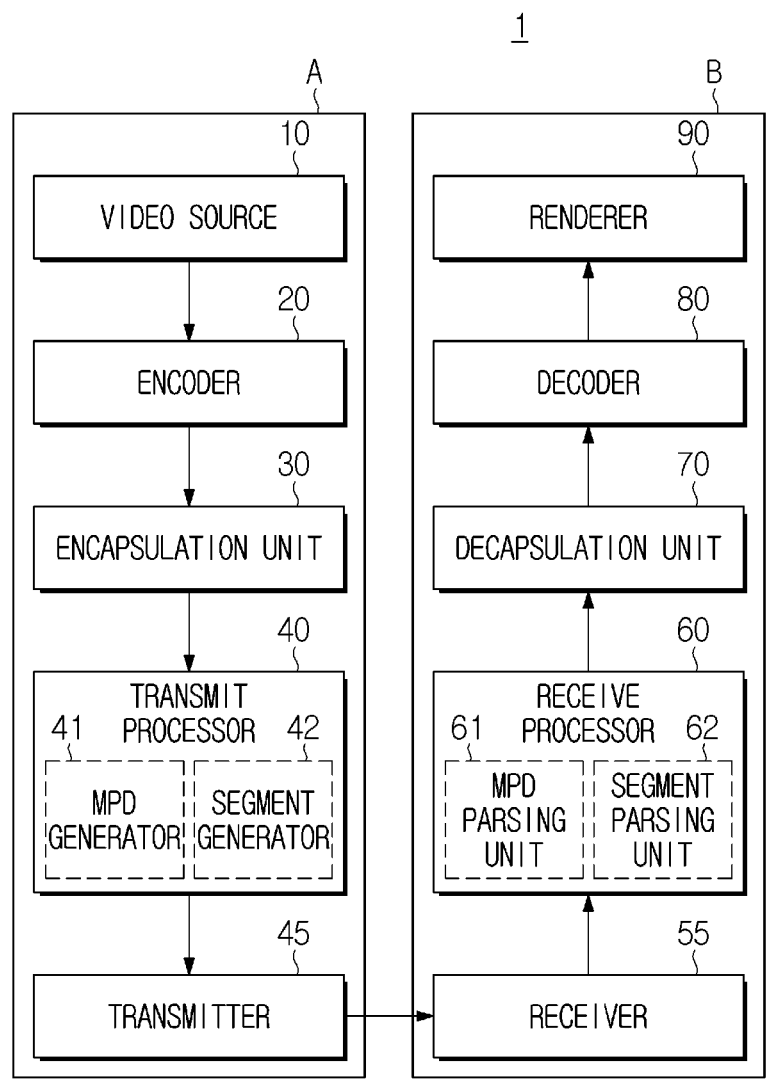
FIG. 1 is a view schematically illustrating a media file transmitting/receiving system according to an embodiment of the present disclosure.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean a block including both a luma component block and a chroma component block or "a luma block of a current block" unless explicitly stated as a chroma block. The luma component block of the current block may be expressed by including an explicit description of a luma component block such as "luma block" or "current luma block. In addition, the "chroma component block of the current block" may be expressed by including an explicit description of a chroma component block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Media File Transmitting/Receiving System

FIG. 1 is a view schematically illustrating a media file transmitting/receiving system according to an embodiment of the present disclosure.

Referring to FIG. 1, the media file transmitting/receiving system 1 may include a transmitting apparatus A and a receiving apparatus B. In some embodiments, the media file transmitting/receiving system 1 may support adaptive streaming based on MPEG-DASH (dynamic adaptive streaming over HTTP), thereby supporting seamless media content reproduction.

The transmitting apparatus A may include a video source 10, an encoder 20, an encapsulation unit 30, a transmit processor 40 and a transmitter 45.

The video source 10 may generate or obtain media data such as video or image. To this end, the video source 10 may include a video/image capture device and/or a video/image generating device or may be connected to an external device to receive media data.

The encoder 20 may encode media data received from the video source 10. The encoder 20 may perform a series of procedures such as prediction, transform, and quantization according to a video codec standard, for example, a Versatile Video Coding (VVC) standard, for compression and encoding efficiency. The encoder 20 may output the encoded media data in the form of a bitstream.

The encapsulation unit 30 may encapsulate the encoded media data and/or media data related metadata. For example, the encapsulation unit 30 may encapsulate the data in a file format such as ISO Base Media File Format (ISO BMFF) or Common Media Application Format (CMAF), or process the data in the form of segments. Media data (hereinafter, referred to as a 'media file') encapsulated in the form of a file may be stored in a storage unit (not shown) in some embodiments. The media file stored in the storage unit may be read by the transmit processor 40 and transmitted to the receiving apparatus B according to an on demand, non-real time (NRT) or broadband method.

The transmit processor 40 may generate an image signal by processing the media file according to an arbitrary transmitting method. The media file transmitting method may include a broadcast method and a broadband method.

According to the broadcast method, the media file may be transmitted using an MPEG Media Transport (MMT) protocol or a Real time Object delivery over Unidirectional Transport (ROUTE) protocol. The MMT protocol may be a transport protocol supporting media streaming regardless of a file format or codec in an IP-based network environment. In the case of using the MMT protocol, the media file may be processed in Media Processing Units (MPUs) based on MMT and then transmitted according to the MMT protocol. The ROUTE protocol is an extension of File Delivery over Unidirectional Transport (FLUTE), and may be a transport protocol supporting real-time transmission of media files. In the case of using the ROUTE protocol, the media file may be processed into one or more segments based on MPEG-DASH and then transmitted according to the ROUTE protocol.

According to the broadband method, the media file may be transmitted through a network using HTTP (HyperText Transfer Protocol). Information transmitted through HTTP may include signaling metadata, segment information, and/or Non-Real Time (NRT) service information.

In some embodiments, the transmit processor 40 may include an MPD generator 41 and a segment generator 42 to support adaptive media streaming.

The MPD generator 41 may generate a Media Presentation Description (MPD) based on the media file. The MPD is a file including detailed information on media presentation, and may be expressed in an XML format. The MPD may provide signaling metadata, such as an identifier for each segment. In this case, the receiving apparatus B may dynamically obtain segments based on the MPD.

The segment generator 42 may generate one or more segments based on the media file. The segment may include actual media data and may have a file format such as ISO BMFF. The segment may be included in the representation of an image signal, and, as described above, may be identified based on the MPD.

In addition, the transmit processor 40 may generate an image signal according to the MPEG-DASH standard based on the generated MPD and segment.

The transmitter 45 may transmit the generated image signal to the receiving apparatus B. In some embodiments, the transmitter 45 may transmit an image signal to the receiving apparatus B through an IP network according to the MMT standard or the MPEG-DASH standard. According to the MMT standard, the image signal transmitted to the receiving apparatus B may include a presentation information document (PI) including reproduction information of the media data. According to the MPEG-DASH standard, the image signal transmitted to the receiving apparatus B may include the aforementioned MPD as reproduction information of the media data. However, in some embodiments, the MPD and the segment may be individually transmitted to the receiving apparatus B. For example, a first image signal including the MPD may be generated by the transmitting apparatus A or an external server and transmitted to the receiving apparatus B, and a second image signal including the segment may be generated by the transmitting apparatus A and may be transmitted to the receiving apparatus B.

Meanwhile, although the transmit processor 40 and the transmitter 45 are illustrated as separate elements in FIG. 1, they may be integrally implemented as a single element in some embodiments. Also, the transmit processor 40 may be implemented as an external device (e.g., DASH server) separate from the transmitting apparatus A. In this case, the transmitting apparatus A may operate as a source apparatus generating a media file by encoding the media data, and the external apparatus may operate as a server apparatus generating an image signal by processing the media data according to an arbitrary transmission protocol.

Next, the receiving apparatus B may include a receiver 55, a receive processor 60, a decapsulation unit 70, a decoder 80, and a renderer 90. In some embodiments, the receiving apparatus B may be an MPEG-DASH-based client.

The receiver 55 may receive an image signal from the transmitting apparatus A. The image signal according to the MMT standard may include a PI document and a media file. In addition, the image signal according to the MPEG-DASH standard may include an MPD and a segment. In some embodiments, the MPD and the segment may be separately transmitted through different image signals.

The receive processor 60 may extract/parse a media file by processing the received image signal according to a transport protocol.

In some embodiments, the receive processor 60 may include an MPD parsing unit 61 and a segment parsing unit 62 in order to support adaptive media streaming.

The MPD parsing unit 61 may obtain an MPD from the received image signal, and parse the obtained MPD to generate a command required for obtaining a segment. Also, the MPD parsing unit 61 may obtain media data reproduction information, for example, color conversion information, based on the parsed MPD.

The segment parsing unit 62 may obtain a segment based on the parsed MPD and parse the obtained segment to extract the media file. In some embodiments, the media file may have a file format such as ISO BMFF or CMAF.

The decapsulation unit 70 may decapsulate the extracted media file to obtain media data and metadata related thereto. The obtained metadata may have the form of a box or track in a file format. In some embodiments, the decapsulation unit 70 may receive metadata required for decapsulation from the MPD parsing unit 61.

The decoder 80 may decode the obtained media data according to a video codec standard, for example, a VVC standard. To this end, the decoder 80 may perform a series of procedures such as inverse quantization, inverse transform, and prediction corresponding to operation of the encoder 20.

The renderer 90 may render media data such as the decoded video or image. The rendered media data may be reproduced through a display unit (not shown).

Hereinafter, a media file transmitting/receiving method will be described in detail.

Figure 2:
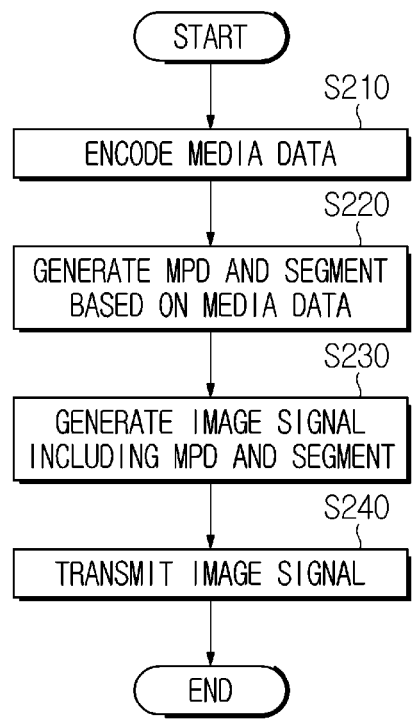
FIG. 2 is a flowchart illustrating a media file transmitting method.

FIG. 2 is a flowchart illustrating a media file transmitting method.

In one example, each step of FIG. 2 may be performed by the transmitting apparatus A of FIG. 1. Specifically, step S210 may be performed by the encoder 20 of FIG. 1. Also, steps S220 and S230 may be performed by the transmit processor 40. Also, step S240 may be performed by the transmitter 45.

Referring to FIG. 2, the transmitting apparatus may encode media data such as a video or an image (S210). The media data may be captured/generated by the transmitting apparatus or obtained from an external device (e.g., camera, video archive, etc.). Media data may be encoded in the form of a bitstream according to a video codec standard, for example, a VVC standard.

The transmitting apparatus may generate an MPD and one or more segments based on the encoded media data (S220). The MPD may include detailed information about media presentation as described above. The segment may contain actual media data. In some embodiments, the media data may be encapsulated in a file format such as ISO BMFF or CMAF and included in a segment.

The transmitting apparatus may generate an image signal including the generated MPD and segment (S230). In some embodiments, the image signal may be individually generated for each of the MPD and segment. For example, the transmitting apparatus may generate a first image signal including an MPD and generate a second image signal including a segment.

The transmitting apparatus may transmit the generated image signal to the receiving apparatus (S240). In some embodiments, the transmitting apparatus may transmit the image signal using a broadcast method. In this case, the MMT protocol or the ROUTE protocol may be used. Alternatively, the transmitting apparatus may transmit the image signal using a broadband method.

Meanwhile, although, in FIG. 2, the MPD and an image signal including the same are described as being generated and transmitted by the transmitting apparatus (steps S220 to S240), in some embodiments, the MPD and an image including the same may be generated and transmitted by an external server different from the transmitting apparatus.

Figure 3:
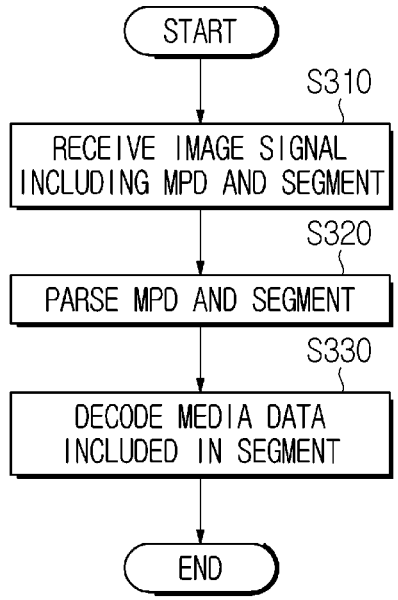
FIG. 3 is a flowchart illustrating a media file receiving method.

FIG. 3 is a flowchart illustrating a media file receiving method.

In an example, each step of FIG. 3 may be performed by the receiving apparatus B of FIG. 1. Specifically, step S310 may be performed by the receiver 55. Also, step S320 may be performed by the receive processor 60. Also, step S330 may be performed by the decoder 80.

Referring to FIG. 3, the receiving apparatus may receive an image signal from the transmitting apparatus (S310). An image signal according to the MPEG-DASH standard may include an MPD and a segment. In some embodiments, the MPD and the segment may be individually received through different image signals. For example, a first image signal including the MPD may be received from the transmitting apparatus of FIG. 1 or an external server, and a second image signal including the segment may be received from the transmitting apparatus of FIG. 1.

The receiving apparatus may extract the MPD and segment from the received image signal, and parse the extracted MPD and segment (S320). Specifically, the receiving apparatus may parse the MPD to generate a command required for obtaining a segment. Then, the receiving apparatus may obtain a segment based on the parsed MPD, and parse the obtained segment to obtain media data. In some embodiments, the receiving apparatus may perform decapsulation on media data in a file format in order to obtain the media data from the segment.

The receiving apparatus may decode the media data such as the obtained video or image (S330). The receiving apparatus may perform a series of procedures such as inverse quantization, inverse transform, and prediction in order to decode the media data. Then, the receiving apparatus may render the decoded media data and reproduce the media data through a display.

Hereinafter, an image encoding/decoding apparatus will be described in detail.

Overview of Image Encoding Apparatus

Figure 4:
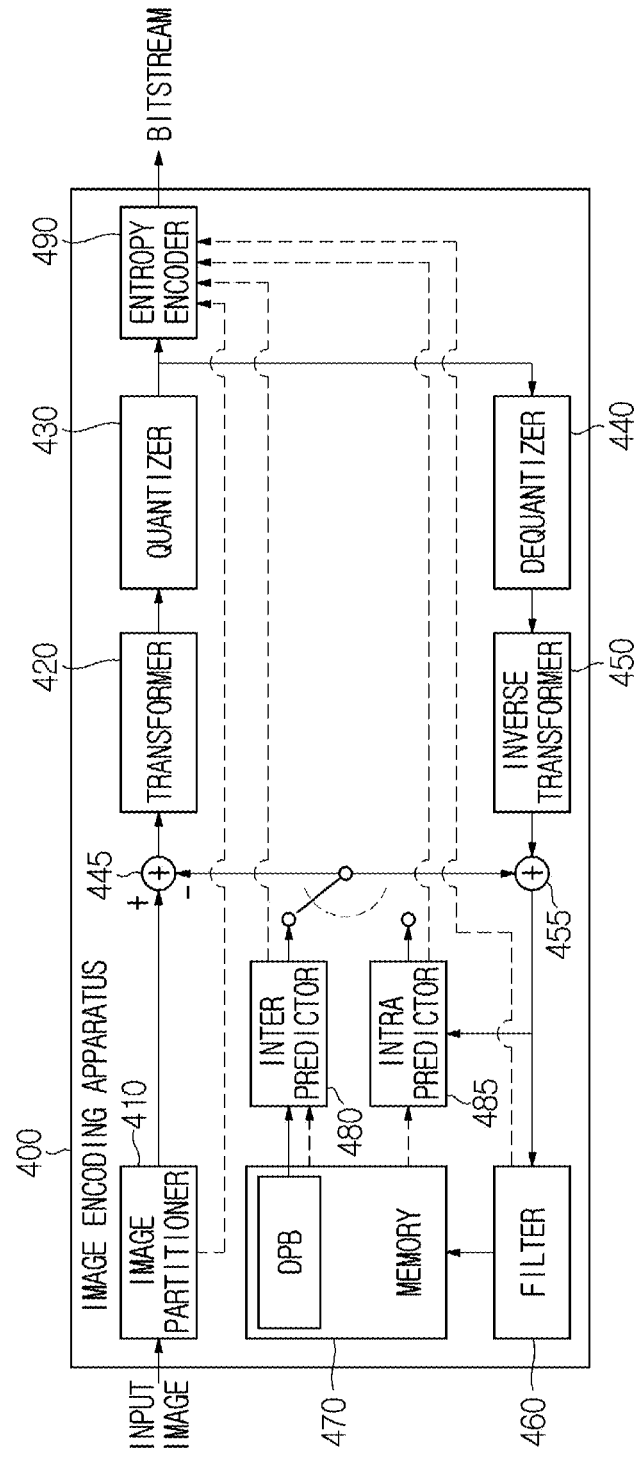
FIG. 4 is a view schematically illustrating an image encoding apparatus according to an embodiment of the present disclosure.

FIG. 4 is a view schematically illustrating an image encoding apparatus according to an embodiment of the present disclosure. The image encoding apparatus 400 of FIG. 4 may correspond to the encoder 20 of the transmitting apparatus A described with reference to FIG. 1.

Referring to FIG. 4, the image encoding apparatus 400 may include an image partitioner 410, a subtractor 415, a transformer 420, a quantizer 430, a dequantizer 440, an inverse transformer 450, an adder 455, a filter 460, a memory 470, an inter prediction unit 480, an intra prediction unit 485 and an entropy encoder 490. The inter prediction unit 480 and the intra prediction unit 485 may be collectively referred to as a "predictor". The transformer 420, the quantizer 430, the dequantizer 440 and the inverse transformer 450 may be included in a residual processor. The residual processor may further include the subtractor 415.

All or at least some of the plurality of components configuring the image encoding apparatus 400 may be configured by one hardware component (e.g., an encoder or a processor) in some embodiments. In addition, the memory 470 may include a decoded picture buffer (DPB) and may be configured by a digital storage medium.

The image partitioner 410 may partition an input image (or a picture or a frame) input to the image encoding apparatus 400 into one or more processing units. For example, the processing unit may be called a coding unit (CU). The coding unit may be obtained by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth obtained by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 480 or the intra prediction unit 485) may perform prediction on a block to be processed (current block) and generate a predicted block including prediction samples for the current block. The prediction unit may determine whether intra prediction or inter prediction is applied on a current block or CU unit. The prediction unit may generate various information related to prediction of the current block and transmit the generated information to the entropy encoder 490. The information on the prediction may be encoded in the entropy encoder 490 and output in the form of a bitstream.

The intra prediction unit 485 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 485 may determine the prediction mode applied to the current block by using a prediction mode applied to a neighboring block.

The inter prediction unit 480 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 480 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter prediction unit 480 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 415 may generate a residual signal (residual block or residual sample array) by subtracting the prediction signal (predicted block or prediction sample array) output from the prediction unit from the input image signal (original block or original sample array). The generated residual signal may be transmitted to the transformer 420.

The transformer 420 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform obtained based on a prediction signal generated using all previously reconstructed pixels. In addition, the transform process may be applied to square pixel blocks having the same size or may be applied to blocks having a variable size rather than square.

The quantizer 430 may quantize the transform coefficients and transmit them to the entropy encoder 490. The entropy encoder 490 may encode the quantized signal (information on the quantized transform coefficients) and output a bitstream. The information on the quantized transform coefficients may be referred to as residual information. The quantizer 430 may rearrange quantized transform coefficients in a block type into a one-dimensional vector form based on a coefficient scanning order and generate information on the quantized transform coefficients based on the quantized transform coefficients in the one-dimensional vector form.

The entropy encoder 490 may perform various encoding methods such as, for example, exponential Golomb, context-adaptive variable length coding (CAVLC), context-adaptive binary arithmetic coding (CABAC), and the like. The entropy encoder 490 may encode information required for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 490 and/or a storage unit (not shown) storing the signal may be included as internal/external element of the image encoding apparatus 400. Alternatively, the transmitter may be provided as the component of the entropy encoder 490.

The quantized transform coefficients output from the quantizer 430 may be used to generate a residual signal. For example, the residual signal (residual block or residual samples) may be reconstructed by applying dequantization and inverse transform to the quantized transform coefficients through the dequantizer 440 and the inverse transformer 450.

The adder 455 adds the reconstructed residual signal to the prediction signal output from the inter prediction unit 480 or the intra prediction unit 485 to generate a reconstructed signal (reconstructed picture, reconstructed block, reconstructed sample array). If there is no residual for the block to be processed, such as a case where the skip mode is applied, the predicted block may be used as the reconstructed block. The adder 455 may be called a reconstructor or a reconstructed block generator. The generated reconstructed signal may be used for intra prediction of a next block to be processed in the current picture and may be used for inter prediction of a next picture through filtering as described below.

Meanwhile, in a picture encoding and/or reconstruction process, luma mapping with chroma scaling (LMCS) is applicable.

The filter 460 may improve subjective/objective image quality by applying filtering to the reconstructed signal. For example, the filter 460 may generate a modified reconstructed picture by applying various filtering methods to the reconstructed picture and store the modified reconstructed picture in the memory 470, specifically, a DPB of the memory 470. The various filtering methods may include, for example, deblocking filtering, a sample adaptive offset, an adaptive loop filter, a bilateral filter, and the like. The filter 460 may generate various information related to filtering and transmit the generated information to the entropy encoder 490 as described later in the description of each filtering method. The information related to filtering may be encoded by the entropy encoder 490 and output in the form of a bitstream.

The modified reconstructed picture transmitted to the memory 470 may be used as the reference picture in the inter prediction unit 480. When inter prediction is applied through the image encoding apparatus 400, prediction mismatch between the image encoding apparatus 400 and the image decoding apparatus may be avoided and encoding efficiency may be improved.

The DPB of the memory 470 may store the modified reconstructed picture for use as a reference picture in the inter prediction unit 480. The memory 470 may store the motion information of the block from which the motion information in the current picture is derived (or encoded) and/or the motion information of the blocks in the picture that have already been reconstructed. The stored motion information may be transmitted to the inter prediction unit 480 and used as the motion information of the spatial neighboring block or the motion information of the temporal neighboring block. The memory 470 may store reconstructed samples of reconstructed blocks in the current picture and may transfer the reconstructed samples to the intra prediction unit 485.

Overview of Image Decoding Apparatus

Figure 5:
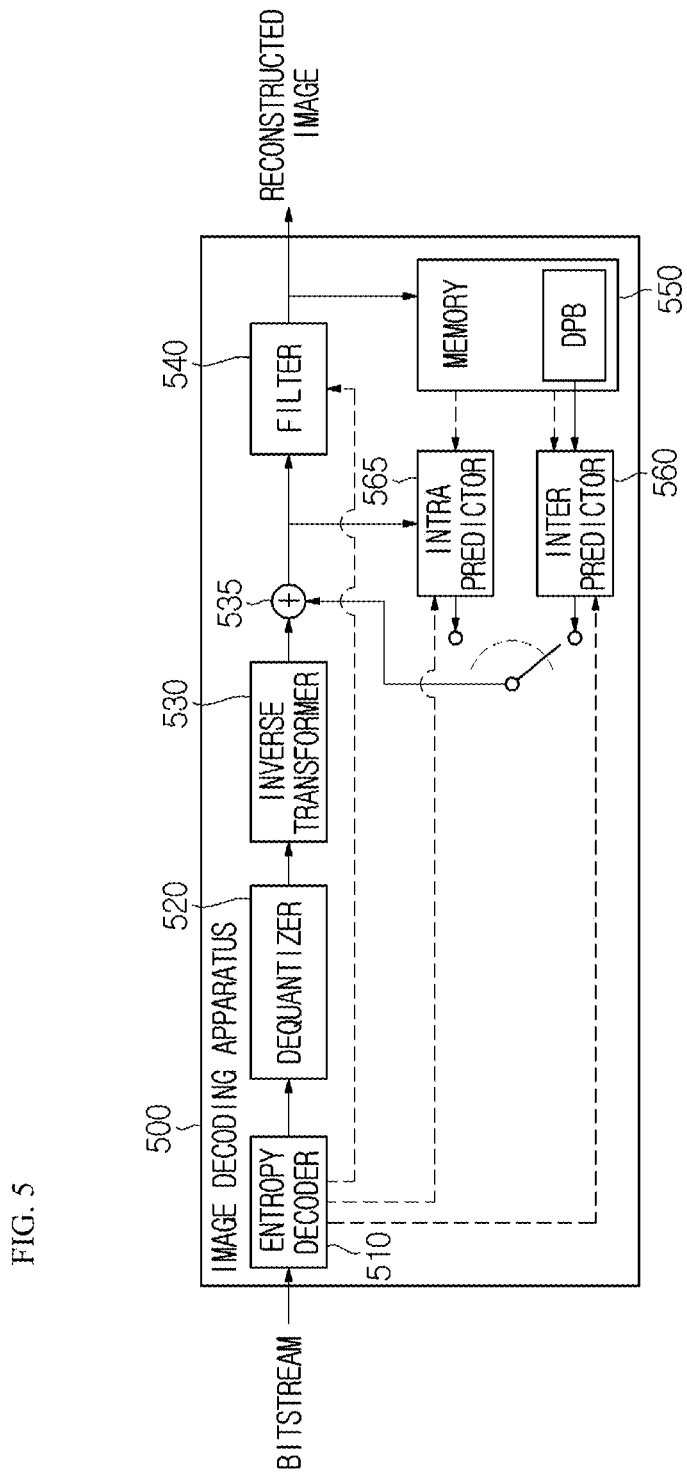
FIG. 5 is a view schematically illustrating an image decoding apparatus according to an embodiment of the present disclosure.

FIG. 5 is a view schematically illustrating an image decoding apparatus according to an embodiment of the present disclosure. The image encoding apparatus 500 of FIG. 5 may correspond to the decoder 80 of the receiving apparatus A described with reference to FIG. 1.

Referring to FIG. 5, the image decoding apparatus 500 may include an entropy decoder 510, a dequantizer 520, an inverse transformer 530, an adder 535, a filter 540, a memory 550, an inter prediction unit 560 and an intra prediction unit 565. The inter prediction unit 560 and the intra prediction unit 565 may be collectively referred to as a "predictor". The dequantizer 520 and the inverse transformer 530 may be included in a residual processor.

All or at least some of a plurality of components configuring the image decoding apparatus 500 may be configured by a hardware component (e.g., a decoder or a processor) according to an embodiment. In addition, the memory 550 may include a decoded picture buffer (DPB) or may be configured by a digital storage medium.

The image decoding apparatus 500, which has received a bitstream including video/image information, may reconstruct an image by performing a process corresponding to a process performed by the image encoding apparatus 100 of FIG. 4. For example, the image decoding apparatus 500 may perform decoding using a processing unit applied in the image encoding apparatus. Thus, the processing unit of decoding may be a coding unit, for example. The coding unit may be obtained by partitioning a coding tree unit or a largest coding unit. The reconstructed image signal decoded and output through the image decoding apparatus 500 may be reproduced through a reproducing apparatus (not shown).

The image decoding apparatus 500 may receive a signal generated by the image encoding apparatus of FIG. 4 in the form of a bitstream. The received signal may be decoded through the entropy decoder 510. For example, the entropy decoder 510 may parse the bitstream to derive information (e.g., video/image information) required for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 510 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 510 may be provided to the prediction unit (the inter prediction unit 560 and the intra prediction unit 565), and the residual value on which the entropy decoding was performed in the entropy decoder 510, that is, the quantized transform coefficients and related parameter information, may be input to the dequantizer 520. In addition, information on filtering among information decoded by the entropy decoder 510 may be provided to the filter 540. Meanwhile, a receiver (not shown) for receiving a signal output from the image encoding apparatus may be further configured as an internal/external element of the image decoding apparatus 500, or the receiver may be a component of the entropy decoder 510.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 510. The sample decoder may include at least one of the dequantizer 520, the inverse transformer 530, the adder 535, the filter 540, the memory 550, the inter prediction unit 560 or the intra prediction unit 565.

The dequantizer 520 may dequantize the quantized transform coefficients and output the transform coefficients. The dequantizer 520 may rearrange the quantized transform coefficients in the form of a two-dimensional block. In this case, the rearrangement may be performed based on the coefficient scanning order performed in the image encoding apparatus. The dequantizer 520 may perform dequantization on the quantized transform coefficients by using a quantization parameter (e.g., quantization step size information) and obtain transform coefficients.

The inverse transformer 530 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 510 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra prediction unit 565 may predict the current block by referring to the samples in the current picture. The description of the intra prediction unit 485 is equally applied to the intra prediction unit 565.

The inter prediction unit 560 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter prediction unit 560 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 535 may generate a reconstructed signal (reconstructed picture, reconstructed block, reconstructed sample array) by adding the obtained residual signal to the prediction signal (predicted block, predicted sample array) output from the prediction unit (including the inter prediction unit 560 and/or the intra prediction unit 565). If there is no residual for the block to be processed, such as when the skip mode is applied, the predicted block may be used as the reconstructed block. The description of the adder 155 is equally applicable to the adder 535. The adder 535 may be called a reconstructor or a reconstructed block generator. The generated reconstructed signal may be used for intra prediction of a next block to be processed in the current picture and may be used for inter prediction of a next picture through filtering as described below.

Meanwhile, in a picture decoding process, luma mapping with chroma scaling (LMCS) is applicable.

The filter 540 may improve subjective/objective image quality by applying filtering to the reconstructed signal. For example, the filter 540 may generate a modified reconstructed picture by applying various filtering methods to the reconstructed picture and store the modified reconstructed picture in the memory 550, specifically, a DPB of the memory 550. The various filtering methods may include, for example, deblocking filtering, a sample adaptive offset, an adaptive loop filter, a bilateral filter, and the like.

The (modified) reconstructed picture stored in the DPB of the memory 550 may be used as a reference picture in the inter prediction unit 560. The memory 550 may store the motion information of the block from which the motion information in the current picture is derived (or decoded) and/or the motion information of the blocks in the picture that have already been reconstructed. The stored motion information may be transmitted to the inter prediction unit 560 so as to be utilized as the motion information of the spatial neighboring block or the motion information of the temporal neighboring block. The memory 550 may store reconstructed samples of reconstructed blocks in the current picture and transfer the reconstructed samples to the intra prediction unit 565.

In the present disclosure, the embodiments described in the filter 460, the inter prediction unit 480, and the intra prediction unit 485 of the image encoding apparatus 400 may be equally or correspondingly applied to the filter 540, the inter prediction unit 560, and the intra prediction unit 565 of the image decoding apparatus 500.

The quantizer of the encoding apparatus may derive quantized transform coefficients by applying quantization to transform coefficients, and the dequantizer of the encoding apparatus or the dequantizer of the decoding apparatus ma derive transform coefficients by applying dequantization to the quantized transform coefficients. In video coding, a quantization rate may be changed and a compression rate may be adjusted using the changed quantization rate. From an implementation point of view, in consideration of complexity, a quantization parameter (QP) may be used instead of directly using the quantization rate. For example, a quantization parameter having an integer value of 0 to 63 may be used and each quantization parameter value may correspond to an actual quantization rate. In addition, a quantization parameter $QP_Y$ for a luma component (luma sample) and a quantization parameter $QP_C$ for a chroma component (chroma sample) may be differently set.

In a quantization process, a transform coefficient C may be received as input and divided by quantization rate $Q_{step}$, and a quantized transform coefficient C' may be derived based on this. In this case, in consideration of computational complexity, the quantization rate is multiplied by a scale to form an integer and shift operation may be performed by a value corresponding to the scale value. Based on the product of the quantization rate and the scale value, a quantization scale may be derived. That is, the quantization scale may be derived according to QP. In this case, by applying the quantization scale to the transform coefficient C, the quantized transform coefficient C' may be derived based on this.

A dequantization process is an inverse process of the quantization process, and the quantized transform coefficient C' may be multiplied by the quantization rate $Q_{step}$, thereby deriving a reconstructed transform coefficient C" based on this. In this case, a level scale may be derived according to the quantization parameter, the level scale may be applied to the quantized transform coefficient C', thereby deriving the reconstructed transform coefficient C" based on this. The reconstructed transform coefficient C" may be slightly different from the original transform coefficient C due to loss in the transform and/or quantization process. Accordingly, even the encoding apparatus may perform dequantization in the same manner as the decoding apparatus.

Meanwhile, adaptive frequency weighting quantization technology of adjusting a quantization strength according to frequency may be applied. The adaptive frequency weighting quantization technology may correspond to a method of differently applying a quantization strength according to the frequency. In adaptive frequency weighting quantization, the quantization strength may differently be applied according to the frequency using a predefined quantization scaling matrix. That is, the above-described quantization/dequantization process may be performed further based on the quantization scaling matrix.

For example, a different quantization scaling matrix may be used according to a size of a current block and/or whether a prediction mode applied to the current block in order to generate a residual signal of the current block is inter prediction or intra prediction. The quantization scaling matrix may also be referred to as a quantization matrix or a scaling matrix. The quantization scaling matrix may be predefined. In addition, frequency quantization scale information for the quantization scaling matrix for frequency adaptive scaling may be constructed/encoded by the encoding apparatus and signaled to the decoding apparatus. The frequency quantization scale information may be referred to as quantization scaling information. The frequency quantization scale information may include scaling list data scaling_list_data.

Based on the scaling list data, the quantization scaling matrix may be derived. In addition, the frequency quantization scale information may include present flag information specifying whether the scaling list data is present. Alternatively, when the scaling list data is signaled at a higher level (e.g., SPS), information specifying whether the scaling list data is modified at a lower level (e.g., PPS or tile group header, etc.) may be further included.

Figure 6:
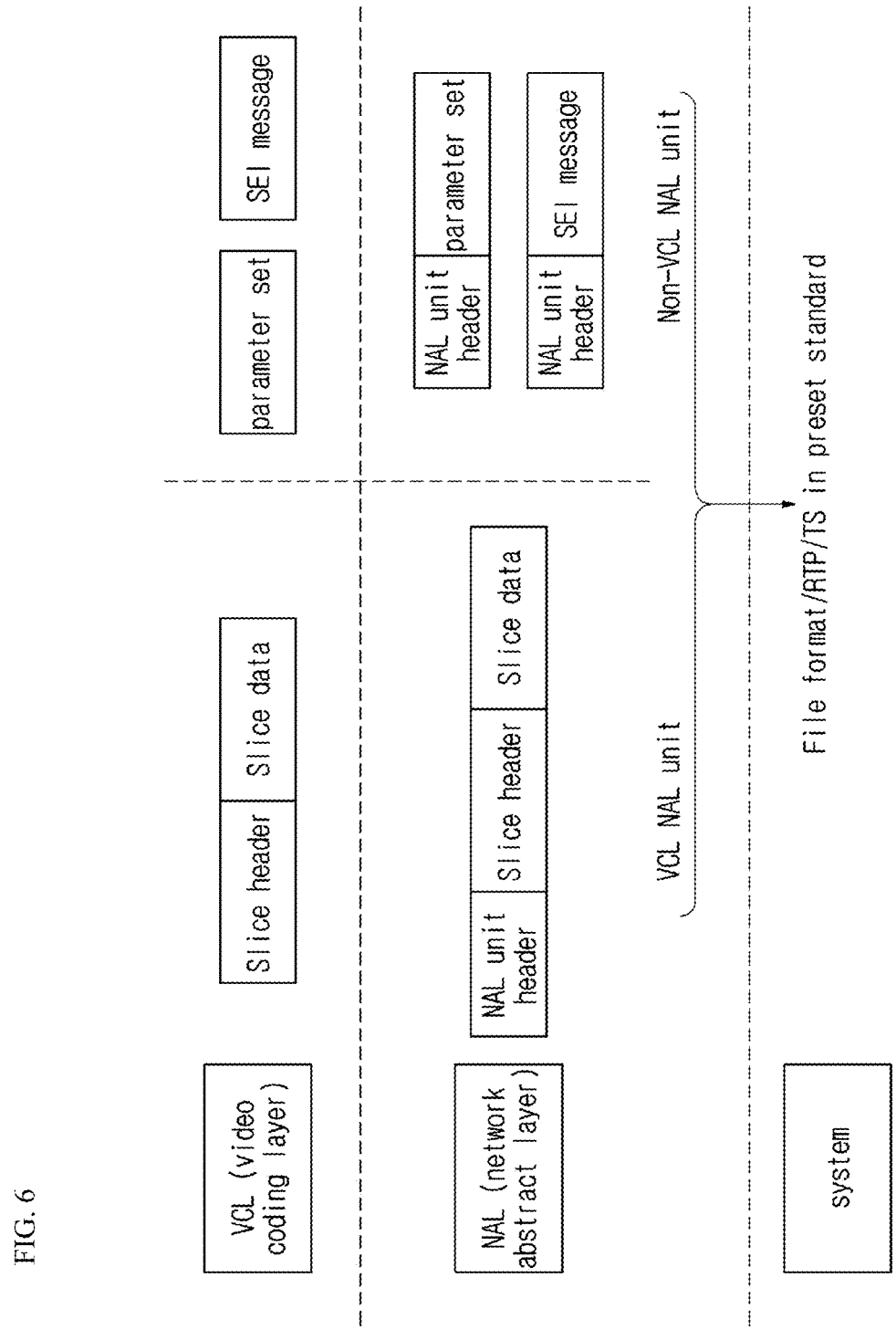
FIG. 6 is a view illustrating an example of a layer structure for a coded image/video.

FIG. 6 is a view illustrating an example of a layer structure for a coded image/video.

The coded image/video is classified into a video coding layer (VCL) for an image/video decoding process and handling itself, a lower system for transmitting and storing encoded information, and a network abstraction layer (NAL) present between the VCL and the lower system and responsible for a network adaptation function.

In the VCL, VCL data including compressed image data (slice data) may be generated or a supplemental enhancement information (SEI) message additionally required for a decoding process of an image or a parameter set including information such as a picture parameter set (PPS), a sequence parameter set (SPS) or a video parameter set (VPS) may be generated.

In the NAL, header information (NAL unit header) may be added to a raw byte sequence payload (RBSP) generated in the VCL to generate a NAL unit. In this case, the RBSP refers to slice data, a parameter set, an SEI message generated in the VCL. The NAL unit header may include NAL unit type information specified according to RBSP data included in a corresponding NAL unit.

As shown in FIG. 6, the NAL unit may be classified into a VCL NAL unit and a non-VCL NAL unit according to the type of the RBSP generated in the VCL. The VCL NAL unit may mean a NAL unit including information on an image (slice data), and the Non-VCL NAL unit may mean a NAL unit including information (parameter set or SEI message) required to decode an image.

The VCL NAL unit and the Non-VCL NAL unit may be attached with header information and transmitted through a network according to the data standard of the lower system. For example, the NAL unit may be modified into a data format of a predetermined standard, such as H.266/VVC file format, RTP (Real-time Transport Protocol) or TS (Transport Stream), and transmitted through various networks.

As described above, in the NAL unit, a NAL unit type may be specified according to the RBSP data structure included in the corresponding NAL unit, and information on the NAL unit type may be stored in a NAL unit header and signaled. For example, this may be largely classified into a VCL NAL unit type and a non-VCL NAL unit type depending on whether the NAL unit includes image information (slice data). The VCL NAL unit type may be classified according to the property/type of the picture included in the VCL NAL unit, and the Non-VCL NAL unit type may be classified according to the type of a parameter set.

The following lists examples of NAL unit types specified according to the type of parameter set/information included in the Non-VCL NAL unit type.

DCI (Decoding capability information) NAL unit type (NUT): type for NAL unit including DCI VPS (Video Parameter Set) NUT: type for NAL unit including VPS SPS(Sequence Parameter Set) NUT: type for NAL unit including SPS PPS (Picture Parameter Set) NUT: type for NAL unit including PPS APS (Adaptation Parameter Set) NUT: type for NAL unit including APS PH (Picture header) NUT: type for NAL unit including picture header The above-described NAL unit types have syntax information for the NAL unit type, and the syntax information may be stored in a NAL unit header and signaled. For example, the syntax information may be nal_unit_type, and NAL unit types may be specified using a nal_unit_type value.

Meanwhile, one picture may include a plurality of slices, and one slice may include a slice header and slice data. In this case, one picture header may be further added to a plurality of slices (slice header and slice data set) in one picture. The picture header (picture header syntax) may include information/parameters commonly applicable to the picture. The slice header (slice header syntax) may include information/parameters commonly applicable to the slice. The APS (APS syntax) or PPS (PPS syntax) may include information/parameters commonly applicable to one or more slices or pictures. The SPS (SPS syntax) may include information/parameters commonly applicable to one or more sequences. The VPS (VPS syntax) may information/parameters commonly applicable to multiple layers. The DCI (DCI syntax) may include information/parameters related to decoding capability.

In the present disclosure, a high level syntax (HLS) may include at least one of the APS syntax, the PPS syntax, the SPS syntax, the VPS syntax, the DCI syntax, the picture header syntax or the slice header syntax. In addition, in the present disclosure, a low level syntax (LLS) may include, for example, a slice data syntax, a CTU syntax, a coding unit syntax, a transform unit syntax, etc.

In the present disclosure, image/video information encoded by the encoding apparatus and signaled to the decoding apparatus in the form of a bitstream may include not only in-picture partitioning related information, intra/inter prediction information, residual information, in-loop filtering information but also information on the slice header, information on the picture header, information on the APS, information on the PPS, information on the SPS, information on the VPS and/or information on the DCI. In addition, the image/video information may further include general constraint information and/or information on a NAL unit header.

Hereinafter, a media file including encoded image information will be described in detail.

Media File for Storing/Transmitting Image Information

The encoded image information may be configured (or formatted) based on a predetermined media file format to generate a media file. For example, the encoded image information may form a media file (segment) based on one or more NAL units/sample entries for the encoded image information.

A media file may include sample entry(s) and track(s). In one example, a media file may include various records, and each record may include information related to a media file format or information related to an image. In one example, one or more NAL units may be stored in a configuration record (or decoder configuration record) field in the media file. Additionally, the media file may contain an operating point record and/or an operating point group box. In this disclosure, a decoder configuration record supporting Versatile Video Coding (VVC) may be referred to as a VVC decoder configuration record. Likewise, an operating point record supporting VVC may be referred to as a VVC operating point record.

The "sample" in the media file format may correspond to all data associated with a single time or single element of any one of three sample arrays (Y, Cb, Cr) representing a picture. When the term "sample" is used in the context of a track (in a media file format), "sample" may mean all data associated with a single time of the track. Here, the time may correspond to a decoding time or a composition time. Also, when the term "sample" is used in the context of a picture (e.g., luma sample), "sample" may indicate a single element of any one of three sample arrays representing the picture.

Figure 7:
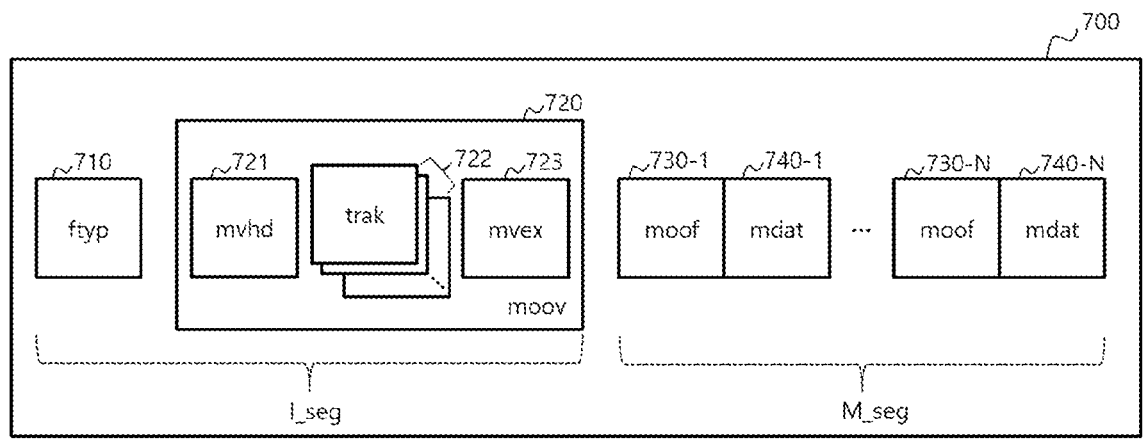
FIG. 7 is a view illustrating a structure of a media file.

FIG. 7 is a view illustrating a structure of a media file.

As described above, in order to store and transmit media data such as audio, video, or image, a standardized media file format may be defined. In some embodiments, the media file may have a file format according to the ISO base media file format (ISO BMFF).

A media file may include one or more boxes. Here, the box may be a data block or object including media data or metadata related to the media data. Within a media file, boxes may form a hierarchical structure. Accordingly, the media file may have a form suitable for storage and/or transmission of large-capacity media data. Also, the media file may have a structure that facilitates access to specific media data.

Referring to FIG. 7, the media file 200 may include an ftyp box 710, a moov box 720, a moof box 730, and an mdat box 740.

The ftyp box 710 may include a file type, file version, and/or compatibility related information of the media file 700. In some embodiments, the ftyp box 710 may be located at the beginning of the media file 700.

The moov box 720 may include metadata describing the media data in the media file 700. In some embodiments, the moov box 720 may be present in an uppermost layer among metadata-related boxes. Also, the moov box 720 may include header information of the media file 700. For example, the moov box 720 may include a decoder configuration record as decoder configuration information.

The moov box 720 is a sub-box, and may include an mvhd box 721, a trak box 722 and an mvex box 723.

The mvhd box 721 may include presentation-related information (e.g., media creation time, change time, period, etc.) of media data in the media file 700.

The trak box 722 may include metadata for a track of media data. For example, the trak box 722 may contain stream-related information, presentation-related information, and/or access-related information for an audio track or a video track. A plurality of trak boxes 722 may be present according to the number of tracks present in the media file 200.

The mvex box 723 may include information on whether one or more movie fragments is present in the media file 700. The movie fragment may be a part of media data obtained by dividing media data in the media file 700. The movie fragment may include one or more coded pictures. For example, the movie fragment may include one or more picture groups (GOPs), and each picture group may include a plurality of coded frames or pictures. The movie fragment may be stored in each of the mdat boxes 740-1 to 740-N (where N is an integer greater than or equal to 1).

The moof boxes 730-1 to 730-N (where N is an integer greater than or equal to 1) may include metadata for movie fragments, that is, mdat boxes 740-1 to 740-N. In some embodiments, the moof boxes 730-1 to 730-N may be present in an uppermost layer among metadata-related boxes of the movie fragment.

The mdat boxes 740-1 to 740-N may include actual media data. A plurality of mdat boxes 740-1 to 740-N may be present according to the number of movie fragments present in the media file 700. Each of the mdat box 740-1 to 740-N may include one or more audio samples or video samples. In one example, a sample may mean an access unit (AU). When the decoder configuration record is stored in the sample entry, the decoder configuration record may include a size of a length field for indicating the length of a Network Abstraction Layer (NAL) unit to which each sample belongs as well as a parameter set.

In some embodiments, the media file 700 may be processed and stored and/or transmitted in units of segments. The segment may include an initialization segment I_seg and a media segment M_seg.

The initialization segment I_seg may be an object type data unit including initialization information for accessing a representation. The initialization segment I_seg may include the aforementioned ftyp box 710 and/or moov box 720.

The media segment M_seg may be an object type data unit including temporally divided media data for a streaming service. The media segment M_seg may include the aforementioned moof boxes 730-1 to 230-N and mdat boxes 740-1 to 740-N. Although not shown in FIG. 7, the media segment M_seg may further include a styp box including segment type related information and a sidx box including identification information of subsegments included in the media file 700 (optional).

As described above, media data may be encapsulated into a media file according to a file format such as ISO BMFF. In addition, the media file may be transmitted through an image signal according to the MMT standard or the MPEG-DASH standard.

Figure 8:
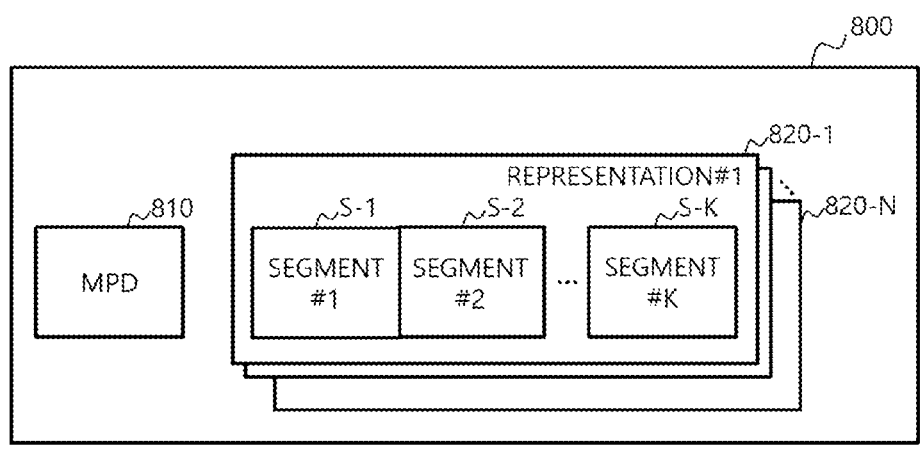
FIG. 8 is a view illustrating a structure of an image signal.

FIG. 8 is a view illustrating a structure of an image signal.

Referring to FIG. 8, an image signal conforms to the MPEG-DASH standard and may include an MPD 810 and a plurality of representations 820-1 to 820-N.

The MPD 810 is a file including detailed information on media presentation, and may be expressed in an XML format. The MPD 810 may include information on a plurality of representations 820-1 to 820-N (e.g., bit rate of streaming content, image resolution, frame rate, etc.) and information on URLs of HTTP resources (e.g., initialization segment and media segments).

Each of the representations 820-1 to 820-N (where N is an integer greater than 1) may be divided into a plurality of segments S-1 to S-K (where K is an integer greater than 1). Here, the plurality of segments S-1 to S-K may correspond to the initialization segment and media segments described above with reference to FIG. 7. The K-th segment S-K may represent the last movie fragment in each of the representations 820-1 to 820-N. In some embodiments, the number (that is, the value of K) of segments S-1 to S-K included in each of the representations 820-1 to 820-N may be different from each other.

Each of the segments S-1 to S-K may include actual media data, such as one or more video or image samples. The characteristics of the video or image samples contained within each of the segments S-1 to S-K may be described by the MPD 810.

Each of the segments S-1 to S-K has a unique URL (Uniform Resource Locator) and thus may be accessed and reconstructed independently.

Meanwhile, in order to store VVC content, three types of elementary streams may be defined. First, a video elementary stream that does not include any parameter set may be defined. In this case, all parameter sets may be stored in one sample entry or a plurality of sample entries. Second, parameter sets may be included, and a video and parameter set elementary stream that may include parameter sets stored in one sample entry or a plurality of sample entries may be defined. Third, a non-VCL elementary stream including non-VCL NAL units synchronized with an elementary stream carried in a video track may be defined. In this case, the non-VCL track may not include a parameter set in the sample entries.

An operating point is a temporal subset of an output layer set (OLS), and may be identified by an output layer set (OLS) index and the maximum value of TemporalId. Each operating point may be associated with a Profile, Tier and Level (PTL) defining a conformance point of the corresponding operating point. In the ISO based media file format (ISO BMFF) for VVC, operating point information may be signaled within a sample of a 'vopi' type group box or an 'opeg' type entity group. Operating point information may be used to identify samples and sample entries for each operating point.

Operating Point Information Sample Group

Information on different operating points provided by a VVC bitstream and constitution of the operating points may be provided to an application using an operating point information sample group 'vopi'. In this case, each operating point may be associated with an output layer set, a maximum TemporalId, and PTL signaling. All of the above information may be captured by the 'vopi' sample group. In addition to the above information, the sample group may provide dependency information between layers. If more than one VVC track is present for a VVC bitstream and no operating point entity group is present for the VVC bitstream, the following two may apply. First, among the VVC tracks for the VVC bitstream, there shall be only one track carrying the 'vopi' sample group. Second, all other VVC tracks in the VVC bitstream shall have an 'oref' type track reference for a track carrying the 'vopi' sample group.

For a specific sample in a track, a temporally collocated sample in other tracks may be defined as having the same decoding time as the decoding time of the specific sample. Within a track $T_N$ with an 'oref' track referring to a track $T_k$ carrying a 'vopi' sample group, the following may be applied to each sample $S_N$. If a temporally collocated sample $S_k$ is present within the track $T_k$, the sample $S_N$ may be associated with the same 'vopi' sample group entry as the sample $S_k$. Otherwise, the sample $S_N$ may be associated with the same 'vopi' sample group entry as the last sample in the track $T_k$ preceding the sample $S_N$ in decoding time.

When a plurality of video parameter sets (VPSs) are referred to by the VVC bitstream, a sample group description box having a 'vopi' group type may include a plurality of entries. In the more general case where there is a single VPS, a default sample group mechanism may be used. In this case, the default sample group mechanism may be defined in a document such as ISO/IEC 14496-12. Also, the operating point information sample group may be included in a sample table box instead of being included in each track fragment. For example, the syntax grouping_type_parameter may not be defined for the syntax SampleToGroupBox having the 'vopi' group type.

FIG. 9 is a diagram illustrating an example of a syntax structure VvcOperatingPointsRecord for signaling operating point information.

Referring to FIG. 9, VvcOperatingPointsRecord may include num_profile_tier_level_minus1. num_profile_tier_level_minus1 plus 1 may represent the number of subsequent PTL combinations and related fields. ptl_max_temporal_id[i] may indicate a maximum TemporalID of a NAL unit of a related bitstream for an i-th PTL structure. ptl_max_temporal_id[i] and max_temporal_id of an operating point described later may be different even if they have the same value. all_independent_layers_flag may indicate that all layers are coded independently without using inter-layer prediction. ptl[i] may indicate an i-th PTL structure. each_layer_is_an_ols_flag may indicate whether an output layer set includes only one layer. ols_mode_idc may indicate an output layer set mode index. num_operating_points may indicate the number of operating points. output_layer_set_idx may indicate an index of an output layer set defining an operating point. Mapping between output_layer_set_idx and layer_id values shall be the same as specified in a VPS for the output layer set with an index of output_layer_set_idx. ptl_idx may indicate an index of a PTL structure listed for the output layer set with an index of output_layer_set_idx. max_temporal_id may indicate a maximum TemporalIId of a NAL unit of an operating point. The maximum TemporalIId value indicated in the layer information sample group may have a different meaning from the maximum TemporalIId of the NAL unit of the operating point.

layer_count may indicate the required number of layers of an operating point. layer_id may indicate a nuh_layer_id value for a layer of an operating point. is_outputlayer may indicate whether a layer is an output layer. frame_rate_info_flag may indicate whether frame rate information is present for an operating point. bit_rate_info_flag may indicate whether bit rate information for an operating point is present. avgFrameRate may indicate an average frame rate for an operating point. constantFrameRate may indicate whether the frame rate of the stream of the operating point is constant. maxBitRate may indicate a maximum bit rate of a stream at an operating point. avgBitRate may indicate the average bit rate of a stream at an operating point. max_layer_count may indicate the number of all layers of all operating points. layerID may indicate nuh_layer_id of a layer in which all direct reference layers are provided in a loop following direct_ref_layerID. num_direct_ref layers may indicate the number of direct reference layers for a layer having nuh_layer_id equal to layerID. direct_ref_layerID may indicate nuh_layer_id of a direct reference layer.

Operating Point Entity Group

An operating point entity group may be defined to provide track mapping to an operating point and profile level information of the operating point. When aggregating samples of a track mapped to an operating point described in an entity group, an implicit reconstruction process may no longer need to remove NAL units to generate a matching VVC bitstream. A track belonging to an operating point entity group shall have a track reference of an 'oref' type to group_id indicated in the operating point entity group. All entity_id values included in the operating point entity group shall belong to the same VVC bitstream. OperatingPointGroupBox shall be included in the GroupsListBox of the movie level MetaBox and not included in the track level or file level MetaBox.

FIG. 10 is a diagram illustrating an example of a syntax structure for signaling an operating point entity group. The syntax structure of FIG. 10 may partially be identical to or overlap with the syntax structure of FIG. 9. Hereinafter, identical/repeated descriptions will be omitted.

Referring to FIG. 10, opeg_ptl[i] may indicate an i-th PTL structure. frame_rate_info_flag may indicate whether frame rate information is present at an operating point. bit_rate_info_flag may indicate whether bit rate information is present at an operating point. entity_count may indicate the number of tracks present at the operating point. entity_idx may indicate an index for an entity_id list of an entity group belonging to an operating point.

Overview of Decoder Configuration Record

When a decoder configuration record is stored in a sample entry, the decoder configuration record may include the size of a length field used for each sample in order to indicate lengths and parameter sets of NAL units. The decoder configuration record may be framed externally. The size of the decoder configuration record may be provided in a structure containing the decoder configuration record.

The decoder configuration record may include a version field. A version of this specification may define version 1 of the decoder configuration record. If the version number is not recognized, the decoder configuration record or a stream to which the decoder configuration record applies shall not be decoded. A compatible extension to the decoder configuration record may extend the decoder configuration record and may not change a configuration version code.

If a track fundamentally contains a VVC bitstream or resolves 'subp' track references, VvcPtlRecord shall be present in the decoder configuration record. If ptl_present_flag is equal to 0 in the decoder configuration record of the track, then the track shall have an 'oref' track reference. Values of syntax elements of VvcPTLRecord, chroma_format_idc and bit_depth_minus8 shall be valid for all parameter sets activated when the stream described by the record is decoded.

Specifically, the following constraints may apply.

A profile indicator general_profile_idc shall indicate a profile that a stream associated with the decoder configuration record conforms to. If SPSs are marked with different profiles, a stream may need to be inspected to determine a profile that the entire stream conforms to. If the entire stream has not been inspected or there is no profile that the entire stream conforms to as a result of inspection, the entire stream may be split into two or more substreams with separate configuration records for which the above rules may be satisfied.

A tier indicator general_tier_flag shall indicate a tier greater than or equal to the highest tier indicated in all parameter sets.

Each bit of general constraint information general_constraint_info may be set only when all parameter sets set a corresponding bit.

A level indicator general_level_idc shall indicate a level of capability greater than or equal to the highest level indicated for the highest tier in all parameter sets.

chroma_format_idc may indicate a chroma format applied to a tack. The following constraints may be applied to chroma_format_idc. When the value of sps_chroma_format_idc is the same in all SPSs referenced by the NAL unit of the track, chroma_format_idc shall be equal to sps_chroma_format_idc (Condition 1). When Condition 1 is not satisfied and ptl_present_flag is equal to a second value (e.g., 1), chroma_format_idc shall be equal to vps_ols_dpb_chroma_format[ output_layer_set_idx] (Condition 2). When both conditions 1 and 2 are not satisfied, chroma_format_idc shall not be present.

bit_depth_minus8 may indicate a bit depth applied to a track. The following constraints may be applied to bit_depth_minus8. When the value of sps_bitdepth_minus8 is the same in all SPSs referenced by the NAL unit of the track, bit_depth_minus8 shall be equal to sps_bitdepth_minus8 (Condition 1). When Condition 1 is not satisfied and ptl_present_flag is equal to a second value (e.g., 1), bit_depth_minus8 shall be equal to vps_ols_dpb_bitdepth_minus8[output_layer_set_idx] (Condition 2). When both conditions 1 and 2 are not satisfied, bit_depth_minus8 shall not be present.

The other important format information used in the VCC elementary stream as well as an explicit indicator of chroma format and bit depth may be provided within the VVC decoder configuration record. If the color space representation is different in VUI information of two sequences, two different VVC sample entries may be required.

Meanwhile, there may be an array set to carry initialization NAL units. The NAL unit types may be restricted to indicate only DCI, VPS, SPS, PPS, prefix APS and prefix SEI NAL units. NAL units included in a sample entry may be included immediately after AUD and OPI NAL units or may be included in the beginning part of an access unit reconstructed from a first sample referencing the sample entry. Arrays may be arranged in order of DCI, VPS, SPS, PPS, prefix APS and prefix SEI.

FIGS. 11 and 12 are diagrams illustrating an example of a syntax structure for signaling a PTL record and a decoder configuration record.

The syntax structures of FIGS. 11 and 12 may partially be identical to or overlap with the syntax structure of FIG. 9. Hereinafter, identical/repeated descriptions will be omitted.

Specifically, referring to FIGS. 11 and 12, general_profile_idc, general_tier_flag, general_sub_profile_idc, general_constraint_info, general_level_idc, ptl_frame_only_constraint_flag, ptl_multilayer_enabled_flag, sublayer_level_present and sublayer_level_idc[i] may include matching values for general_profile_idc, general_tier_flag and general_sub_profile_idc fields and bits of general_constraint_info( ), general_level_idc, ptl_multilayer_enabled_flag, ptl_frame_only_constraint_flag, sublayer_level_present and sublayer_level_idc[i].

avgFrameRate may provide an average frame rate in 256-second frame units for streams to which the decoder configuration record is applied. avgFrameRate equal to a first value (e.g., 0) may indicate an unspecified average frame rate. constantFrameRate equal to a second value (e.g., 1) may indicate that a stream to which the decoder configuration record is applied has a fixed frame rate. constantFrameRate equal to a third value (e.g., 2) may indicate that the expression of each temporal layer is a constant frame rate. constantFrameRate equal to a first value (e.g., 0) may indicate that it may or may not be a constant frame rate. numTemporalLayers greater than the second value (e.g., 1) may indicate that a track to which the decoder configuration record is applied is temporarily expandable. In addition, the number of included temporal layers may be equal to numTemporalLayers. numTemporalLayers equal to a second value (e.g., 1) may indicate that a track to which the decoder configuration record is applied is not temporarily expandable. numTemporalLayers equal to a first value (e.g., 0) may indicate that it is not known whether a track to which the decoder configuration record is applied is temporarily expandable. lengthSizeMinusOne plus a second value (e.g., 1) may indicate the length of a NALUnitLength field in the VVC bitstream sample of the stream to which the decoder configuration record is applied in bytes. The value of the above field shall be one of 0, 1 or 3 corresponding to an encoded length of 1, 2 or 4 bytes, respectively.

ptl_present_flag may indicate whether a track includes a VVC bitstream corresponding to a specific output layer set. ptl_present_flag equal to a second value (e.g., 1) may indicate that a track includes a VVC bitstream corresponding to a specific output layer set. ptl_present_flag equal to a first value (e.g., 0) may indicate that a track may not include a VVC bitstream corresponding to a specific output layer set. However, ptl_present_flag equal to a first value (e.g., 0) may indicate that one or more individual layers not forming an output layer set or individual lower layers excluding a lower layer having a TemporalId of 0 are included. num_sub_profiles may indicate the number of sub profiles indicated in the decoder configuration record. track_ptl may indicate a PTL indicated by a VVC bitstream included in a track. chroma_format_present_flag may indicate whether chroma_format_idc is present. chroma_format_present_flag equal to a first value (e.g., 0) may indicate that chroma_format_idc is not present. chroma_format_present_flag equal to a second value (e.g., 1) may indicate that chroma_format_idc is present. bit_depth_present_flag may indicate whether bit_depth_minus8 is present. bit_depth_present_flag equal to a first value (e.g., 0) may indicate that bit_depth_minus8 is not present. bit_depth_present_flag equal to a second value (e.g., 1) may indicate that bit_depth_minus8 is present.

numArrays may indicate the number of NAL unit arrays of the indicated type. array_completeness may indicate whether a NAL unit of a given type is present in an array. array_completeness equal to a first value (e.g., 0) may indicate that an additional NAL unit of the indicated type may not be present in a stream. array_completeness equal to a second value (e.g., 1) may indicate that all NAL units of a given type are present in an array and not present in a stream. Default and allowed values may be limited to sample entry names. NAL_unit_type may indicate the type of the NAL unit in the following array. NAL_unit_type may be constrained to take one of values representing a DCI, VPS, SPS, PPS, APS, prefix SEI or suffix SEI NAL unit. numNalus may indicate the number of NAL units of the indicated type included in the decoder configuration record for the stream to which the decoder configuration record is applied. The SEI array shall only contain SEI messages of a 'declarative' nature, that is, messages that provide information on the stream as a whole. An example of such an SEI may correspond to a user data SEI. nalUnitLength may indicate the byte length of the NAL unit. NAL units may include DCI, VPS, SPS, PPS, APS or declarative SEI NAL units.

VVC Bitstream Reconstruction and Data Sharing

To reconstruct an access unit from samples of multiple tracks carrying a multi-layer VVC bitstream, an operating point may first be determined. When the VVC bitstream is represented by multiple tracks, a file parser may identify tracks required for the selected operating point through the following process.

All tracks with VVC sample entries may be found.

When a track contains an 'oref' track reference to the same ID, the ID may be identified as a VVC track or an 'opeg' entity group.

Such an operating point may be selected from an 'opeg' entity group or a 'vopi' sample group suiting decoding capacity and application purpose.

When an 'opeg' entity group is present, a track set may accurately represent a selected operating point. Accordingly, a VVC bitstream may be reconstructed and decoded from the track set.

When an 'opeg' entity group is not present (that is, when a 'vopi' sample group is present), a track set necessary to decode an operating point selected from 'vopi' and 'linf' sample groups may be found.

In order to reconstruct the bitstream from multiple VVC tracks carrying the VVC bitstream, first, TemporalId which is the highest target value needs to be determined. When several tracks contain data for an access unit, alignment of each sample within the tracks may be performed based on a sample decoding time (i.e., a time-to-sample table that does not consider edit lists). When a VVC bitstream is represented by several VVC tracks, the decoding time of the samples shall be set so that the access unit order is correct if the tracks are combined into a single stream aligned in ascending order of decoding time. A sequence of access units may be reconstructed from each sample in the required tracks according to an implicit reconstruction process.

When an operating point information sample group is present, the required track may be selected based on a carrying layer and reference layer as indicated in the operating point information and layer information sample group. When an operating point entity group is present, the required track may be selected based on information on OperatingPointGroupBox. When reconstructing a bitstream in which a VCL NAL unit contains a sublayer with a TemporalId greater than 0, all lower layers within the same layer (i.e., a lower layer in which the VCL NAL unit has a smaller TemporalId) may be included in a resulting bitstream. In addition, the required track may be selected. When reconstructing an access unit, picture units of samples having the same decoding time may be placed in the access unit in ascending order of nuh_layer_id values.

If the access unit is reconstructed to a dependent layer and max_tid_il_ref_pics_plus1 is greater than a first value (e.g., 0), the sublayer of the reference layer in which a VCL NAL unit has a TemporalId of max_tid_il_ref_pics_plus1-1 or less within the same layer may be included in the resulting bitstream. In addition, the required track may be selected. When an access unit is reconstructed to a dependent layer and max_tid_il_ref_pics_plus1 is equal to a first value (e.g., 0), only the IRAP picture unit of the reference layer may be included in the resulting bitstream. In addition, the required track may be selected. If a 'subp' track reference is included in the VVC track, each picture unit may be reconstructed with additional constraints for end of sequence (EOS) and end of bitstream (EOB) NAL units. The reconstruction process may be repeated for each layer of a target operating point in an increasing order of nuh_layer_id. Otherwise, each picture unit may be reconstructed. Reconstructed access units may be placed in the VVC bitstream in order of increasing decoding time. In addition, copies of EOB and EOS NAL units may be removed from the VVC bitstream.

In the case of access units belonging to different lower layers stored in the same coded video sequence of the VVC bitstream and stored in several tracks, there may be two or more tracks containing an EOS NAL unit with specific nuh_layer_id values in each sample. In this case, only one of the EOS NAL units shall be kept in the last one of these access units in the last reconstructed bitstream and shall be placed after all NAL units except the last EOB NAL unit of this access unit. In addition, other EOS NAL units may be discarded. Similarly, there may be one or more tracks containing EOB NAL units in each sample. In this case, only one of the EOB NAL units shall be kept in the last reconstructed bitstream and shall be placed at the end of this access unit. In addition, other EOS NAL units may be discarded.

Since a particular layer or sublayer may be represented by one or more tracks, when finding a track required for an operating point, the required track may be selected from among the track sets carrying all of the particular layer or sublayer. If no operating point entity group is present, after selecting among tracks carrying the same layer or sublayer, the last required track may still collectively carry some layers or sublayers not belonging to the target operating point. The reconstructed bitstream for the target operating point shall contain no layers or sublayers that are carried in the last required track but do not belong to the target operating point. The VVC decoder configuration may use, as input, a bitstream corresponding to a target output layer set index corresponding to TargetOlsIdx and HighestTid variables and the highest TemporalId value of a target operating point. The file parser may check whether or not the reconstructed bitstream contains other layers and lower layers other than those included in the target operating point before being sent to a VVC decoder.

Signaling of an output layer set index and an operating point in relation to VVC and EVC transmission in ISO BMFF may include at least one of the following problems.

Problem 1: 16 bits are allocated to signal num_operating_points in OperatingPointGroupBox and VvcOperatingPointsRecord. However, considering that only 9 bits are needed to signal a maximum number of output layer sets and only 3 bits are needed to signal a maximum temporal sublayer, 16 bits may be excessive. That is, only 12 bits are required to signal num_operating_points.

Problem 2: When the stored VVC bitstream is a single layer bitstream, all values of an output layer set index in a list of operating points have the same value. Therefore, there is no need to repeat signaling of the output layer set index in the list of operating points.

An embodiment according to the present disclosure may include at least one of the following configurations in order to solve at least one of the above problems. The following configurations may be implemented in combination or implemented alone.

Configuration 1: Only 12 bits may be used for signaling of num_operating_points using 16 bits in OperatingPointGroupBox and VvcOperatingPointsRecord. The unused 4 bits may be used as reserved bits.

Configuration 2: Information indicating whether all operating points included in OperatingPointGroupBox and/or VvcOperatingPointsRecord are associated with the same output layer set (e.g., same_ols_idx_flag) may be signaled.

Configuration 3: When same_ols_idx_flag is a second value (e.g., 1), syntax indicating output layer set indices of all operating points may be present. This output layer set index may correspond to based_ols_idx. Otherwise, when same_ols_idx_flag is a second value (e.g., 1), all operating points may be associated with an output layer set with an index of a first value (e.g., 0).

Configuration 4: When same_ols_idx_flag is a second value (e.g., 1), output_layer_set_idx may not be present. When same_ols_idx_flag is a second value (e.g., 1), if output_layer_set_idx is present, the value of output_layer_set_idx may be inferred to be the same as based_ols_idx or may be inferred to be a first value (e.g., 0).

Configuration 5: When same_ols_idx_flag is a second value (e.g., 1), layer_count may not be present and the value of layer_count may be inferred to be a second value (e.g., 1).

Configuration 6: When same_ols_idx_flag is a second value (e.g., 1), there may be a restriction that all tracks associated with an operating point include samples of a single layer. layer_id may not be present.

Configuration 7: When same_ols_idx_flag is a second value (e.g., 1), is_outputlayer may not be present and the value of is_outputlayer may be inferred to be a second value (e.g., 1).

Configuration 8: same_ols_idx_flag may be replaced with information indicating that all operating points are associated with an output layer set including only a single layer (e.g., single_layer_operating_points_flag).

FIG. 13 is a diagram illustrating an example of a syntax structure for signaling operating point number information in VvcOperatingPointsRecord according to an embodiment of the present disclosure.

For example, the syntax structure according to FIG. 13 is to solve Problem 1 above, and may be related to Configuration 1 above.

The syntax structure of FIG. 9 and the syntax structure of FIG. 13 may be partially the same or overlap. In the syntax structure of FIG. 9 and the syntax structure of FIG. 13, description of the same or overlapping syntax may be omitted. Specifically, referring to FIG. 13, 1 bit may be allocated to signal all_independent_layers_flag. When all_independent_layers_flag is a first value (e.g., 0), ols_mode_idc may be signaled. When ols_mode_idc is signaled, 8 bits may be allocated to signal ols_mode_idc. In addition, 12 bits may be allocated to signal num_operating_points, instead of 16 bits. The remaining 4 bits may be used as reserved bits. For example, the remaining 4 bits may be used for purposes other than num_operating_points or stored for future use.

FIG. 14 is a diagram illustrating an example of a syntax structure for signaling operating point number information in OperatingPointGroupBox according to an embodiment of the present disclosure.

For example, the syntax structure according to FIG. 14 is to solve Problem 1 above, and may be related to Configuration 1 above.

The syntax structure of FIG. 10 and the syntax structure of FIG. 14 may be partially the same or overlap. In the syntax structure of FIG. 10 and the syntax structure of FIG. 14, description of the same or overlapping syntax may be omitted. Specifically, referring to FIG. 14, 8 bits may be allocated to signal num_profile_tier_level_minus1. In addition, 12 bits may be allocated to signal num_operating_points, instead of 16 bits. The remaining 4 bits may be used as reserved bits. For example, the remaining 4 bits may be used for purposes other than num_operating_points or stored for future use.

FIG. 15 is a diagram illustrating an example of a syntax structure for signaling information indicating whether all operating points in VvcOperatingPointsRecord are associated with the same output layer set according to an embodiment of the present disclosure.

For example, the syntax structure according to FIG. 15 is to solve Problem 2 above, and may be related to Configurations 2, 3, 4, 5, 6, and 7 above.

The syntax structure of FIG. 9 and the syntax structure of FIG. 15 may be partially the same or overlap. In the syntax structure of FIG. 9 and the syntax structure of FIG. 15, description of the same or overlapping syntax may be omitted. Specifically, referring to FIG. 15, 12 bits may be allocated bits to signal num_operating_points, instead of 16. The remaining 3 bits may be used as reserved bits. For example, the remaining 3 bits may be used for purposes other than num_operating_points or stored for future use. In addition, 1 bit may be allocated to signal same_ols_idx_flag. When same_ols_idx_flag is a second value (e.g., 1), information (e.g., op_ols_idx) indicating output layer set indices associated with all operating points may be signaled. 16 bits may be allocated to signal op_ols_idx. If op_ols_idx is not present, the value of op_ols_idx may be inferred to be a first value (e.g., 0).

When same_ols_idx_flag is a first value (e.g., 0), 16 bits may be allocated to signal output_layer_set_idx. Mapping between output_layer_set_idx and layer_id values shall be the same as specified in the VPS for the output layer set with output_layer_set_idx. When output_layer_set_idx is not present, the value of output_layer_set_idx may be inferred to be the same as op_ols_idx. In addition, 8 bits may be allocated to signal layer_count. When layer_count is not present, the value of layer_count may be inferred to be a second value (e.g., 1). In addition, 6 bits may be allocated to signal layer_id. In addition, 1 bit may be allocated to signal is_outputlayer. When is_outputlayer is not present, the value of is_outputlayer may be inferred to be a second value (e.g., 1). The remaining 1 bit may be used as a reserved bit.

FIG. 16 is a diagram illustrating an example of a syntax structure for signaling information indicating whether all operating points in OperatingPointGroupBox are associated with the same output layer set according to an embodiment of the present disclosure.

For example, the syntax structure according to FIG. 16 is to solve Problem 2 above, and may be related to Configurations 2, 3, 4, 5, 6, and 7 above.

The syntax structure of FIG. 10 and the syntax structure of FIG. 16 may be partially the same or overlap. In the syntax structure of FIG. 10 and the syntax structure of FIG. 16, description of the same or overlapping syntax may be omitted. Specifically, referring to FIG. 16, 12 bits may be allocated to signal num_operating_points, instead of 16 bits. The remaining 3 bits may be used as reserved bits. For example, the remaining 3 bits may be used for purposes other than num_operating_points or stored for future use. In addition, 1 bit may be allocated to signal same_ols_idx_flag. When same_ols_idx_flag is a second value (e.g., 1), op_ols_idx may be signaled. 16 bits may be allocated to signal op_ols_idx. When op_ols_idx is not present, the value of op_ols_idx may be inferred to be a first value (e.g., 0).

When same_ols_idx_flag is a first value (e.g., 0), 16 bits may be allocated to signal output_layer_set_idx. Mapping between output_layer_set_idx and layer_id values shall be the same as specified in the VPS for the output layer set with output_layer_set_idx. When output_layer_set_idx is not present, the value of output_layer_set_idx may be inferred to be the same as op_ols_idx. In addition, 8 bits may be allocated to signal layer_count. When layer_count is not present, the value of layer_count may be inferred to be a second value (e.g., 1). In addition, 6 bits may be allocated to signal layer_id. In addition, 1 bit may be allocated to signal is_outputlayer. If is_outputlayer is not present, the value of is_outputlayer may be inferred to be a second value (e.g., 1). The remaining 1 bit may be used as a reserved bit.

Figure 17:
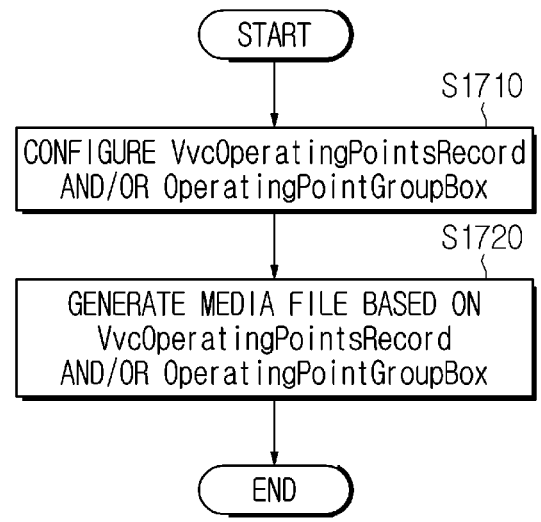
FIG. 17 is a diagram for explaining operation of a media file generating apparatus according to an embodiment of the present disclosure.

FIG. 17 is a diagram for explaining operation of a media file generating apparatus according to an embodiment of the present disclosure.

Referring to FIG. 17, the media file generating apparatus may configure VvcOperatingPointsRecord and/or OperatingPointGroupBox (S1710). VvcOperatingPointsRecord and/or OperatingPointGroupBox may include syntax and information described in Configurations 1 through 8 described above. Thereafter, the media file generating apparatus may generate a media file based on VvcOperatingPointsRecord and/or OperatingPointGroupBox (S1720). VvcOperatingPointsRecord and/or OperatingPointGroupBox may include information related to an operating point or information related to an output layer set.

The generated media file may be transmitted to a media file receiving apparatus through a network.

Figure 18:
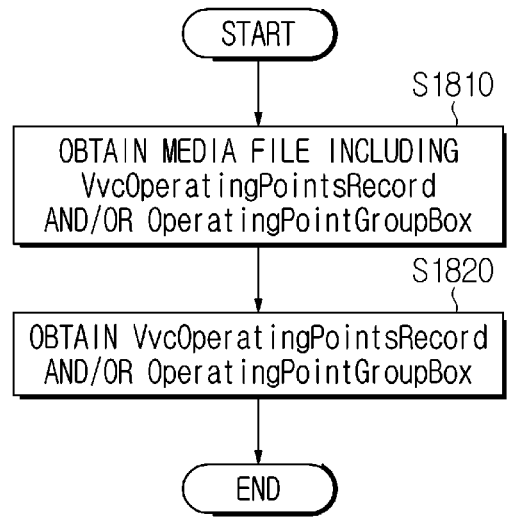
FIG. 18 is a diagram for explaining operation of a media file receiving apparatus according to an embodiment of the present disclosure.

FIG. 18 is a diagram for explaining operation of a media file receiving apparatus according to an embodiment of the present disclosure.

Referring to FIG. 18, the media file receiving apparatus may obtain a media file including VvcOperatingPointsRecord and/or OperatingPointGroupBox (S1810). In addition, the media file receiving apparatus may obtain VvcOperatingPointsRecord and/or OperatingPointGroupBox (S1820). The media file receiving apparatus may derive an operating point or output layer set based on VvcOperatingPointsRecord and/or OperatingPointGroupBox. Image decoding may be performed based on the derived operating point or output layer set.

Figure 19:
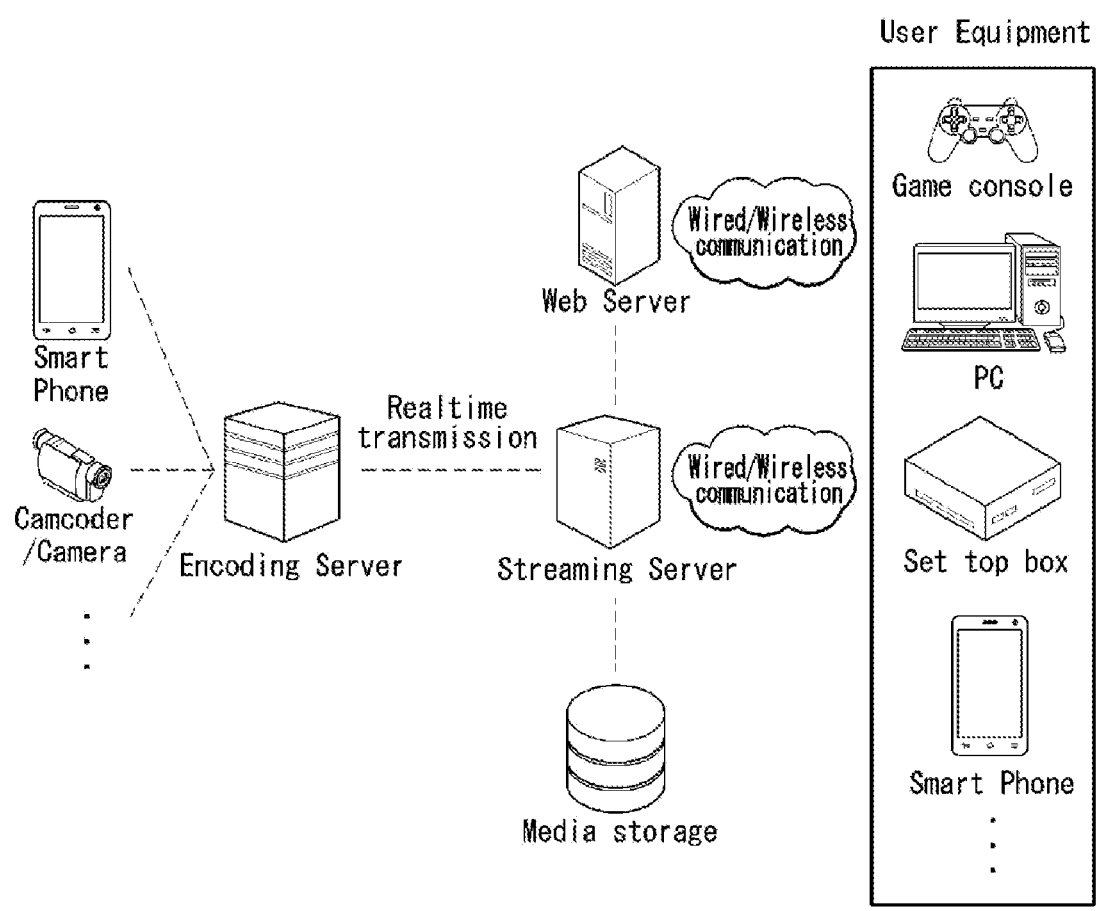
FIG. 19 is a view showing a content streaming system, to which an embodiment of the present disclosure is applicable.

FIG. 19 is a view showing a content streaming system, to which an embodiment of the present disclosure is applicable.

As shown in FIG. 19, the content streaming system, to which the embodiment of the present disclosure is applied, may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to generate and transmit/receive a media file.

The invention claimed is:

1. A media file receiving method performed by a media file receiving apparatus for receiving a media file of a predetermined format, the media file including video data, the method comprising:
obtaining operating point information for the video data from the media file; and
processing the video data based on the obtained operating point information,
wherein, the operating point information includes information on a number of operating points for the video data,
wherein, a bit length of the information on the number of operating points is 12 bits, and
wherein, the information on the number of operating points, having the bit length of 12 bits, is a single piece of information.

2. The method of claim 1, wherein, the bit length of the information on the number of operating points is determined based on maximum number of output layer sets and maximum temporal sublayer.

3. The method of claim 1, wherein, the operating point information further includes first information indicating whether all operating points are associated with a same output layer set.

4. The method of claim 3, wherein, information indicating an output layer index of all the operating points is obtained based on the first information indicating that all the operating points are associated with the same output layer set.

5. The method of claim 3, wherein, all the operating points are associated with an output layer set with index 0 based on the first information indicating that all the operating points are associated with the same output layer set.

6. The method of claim 3, wherein, an output layer set index of each operating point is not obtained based on the first information indicating that all the operating points are associated with the same output layer set.

7. The method of claim 4, wherein, a value of the output layer set index of each operating point is inferred to be the same as a value of the output layer set index of all the operating points based on the first information indicating that all the operating points are associated with the same output layer set and presence of information indicating the output layer index of all the operating points.

8. The method of claim 4, wherein, a value of an output layer set index of each operating point is inferred to be 0 based on the first information indicating that all the operating points are associated with the same output layer set.

9. The method of claim 3, wherein, information indicating the required number of layers of operating points is not obtained based on the first information indicating that all the operating points are associated with the same output layer set.

10. The method of claim 3, wherein, all tracks associated with operating points contains samples of one layer based on the first information indicating that all the operating points are associated with the same output layer set.

11. The method of claim 3, wherein, information indicating whether a layer is an output layer is not obtained based on the first information indicating that all the operating points are associated with the same output layer set.

12. A media file receiving apparatus comprising a memory and at least one processor,
wherein the at least one processor is configured to:
obtain operating point information for video data from a media file; and
process the video data based on the obtained operating point information,
wherein, the operating point information includes information on a number of operating points for the video data,
wherein, a bit length of the information on the number of operating points is 12 bits, and wherein, the information on the number of operating points, having the bit length of 12 bits, is a single piece of information.

13. A media file generating method performed by a media file generating apparatus for generating a media file of a predetermined format, the media file including video data, the method comprising:
   generating operating point information for the video data; and
   generating the media file based on the obtained operating point information,
   wherein, the operating point information includes information on a number of operating points for the video data,
   wherein, a bit length of information on the number of operating points is 12 bits, and
   wherein, the information on the number of operating points, having the bit length of 12 bits, is a single piece of information.

14. A method of transmitting a media file generated by the media file generating method of claim 13.

* * * * *